United States Patent
Sugie et al.

(10) Patent No.: US 8,776,829 B2
(45) Date of Patent: Jul. 15, 2014

(54) VALVE APPARATUS AND WATER HEATING APPARATUS

(71) Applicant: Noritz Corporation, Hyogo (JP)

(72) Inventors: Shigeo Sugie, Kobe (JP); Makoto Hamada, Miki (JP); Yoshihito Okitsu, Akashi (JP)

(73) Assignee: Noritz Corporation, Hyogo (JP)

( * ) Notice: Subject to any disclaimer, the term of this patent is extended or adjusted under 35 U.S.C. 154(b) by 112 days.

(21) Appl. No.: 13/631,174

(22) Filed: Sep. 28, 2012

(65) Prior Publication Data
US 2013/0081727 A1 Apr. 4, 2013

(30) Foreign Application Priority Data

Sep. 30, 2011 (JP) ................. 2011-217326
Dec. 28, 2011 (JP) ................. 2011-288880
Jul. 13, 2012 (JP) ................. 2012-157333

(51) Int. Cl.
*F16K 11/074* (2006.01)
*F16K 5/00* (2006.01)
*B60H 1/00* (2006.01)

(52) U.S. Cl.
USPC .............. 137/625.46; 137/625.15; 137/887

(58) Field of Classification Search
CPC ..... F16K 11/0856; F16K 11/076; F16K 3/08; F16K 5/0414; F24H 9/126

USPC ......... 137/625.46, 887, 625.15, 876; 165/103
See application file for complete search history.

(56) References Cited

U.S. PATENT DOCUMENTS

| | | | | |
|---|---|---|---|---|
| 1,188,085 | A | * | 6/1916 | Krupp ...................... 137/625.19 |
| 3,636,981 | A | * | 1/1972 | Henry ...................... 137/625.46 |
| 3,916,950 | A | * | 11/1975 | Mongerson et al. ..... 137/625.41 |
| 5,152,321 | A | * | 10/1992 | Drager et al. ............ 137/625.29 |
| 5,931,196 | A | * | 8/1999 | Bernardi et al. ......... 137/625.46 |
| 6,308,739 | B1 | * | 10/2001 | Barbuto et al. .......... 137/625.19 |
| 6,575,195 | B2 | * | 6/2003 | Wichmann ............... 137/625.17 |
| 2006/0174954 | A1 | | 8/2006 | Hasko et al. |

FOREIGN PATENT DOCUMENTS

| | | |
|---|---|---|
| JP | 04-141709 A | 5/1992 |
| JP | 2000-120910 A | 4/2000 |
| JP | 2002-022039 A | 1/2002 |
| JP | 2006-521520 A | 9/2006 |

* cited by examiner

*Primary Examiner* — John K Fristoe, Jr.
*Assistant Examiner* — Michael R Reid
(74) *Attorney, Agent, or Firm* — Studebaker & Brackett PC

(57) ABSTRACT

A shaft body (12) is rotatable around an axial line (C-C). A first valve element (13a) is located between a first opening (11a) and a second opening (11b) and it has a first notch (13a₁). A second valve element (13b) is located between first opening (11a) and a third opening (11c) and it has a second notch (13b₁). By rotating first and second valve elements (13a, 13b) around the axial line (C-C) as a center (O), an operation for opening and closing first and second notches (13a₁, 13b₁) can be performed.

15 Claims, 18 Drawing Sheets

(A)

(B)

(C)

VALVE APPARATUS AND WATER HEATING APPARATUS

BACKGROUND OF THE INVENTION

1. Field of the Invention

The present invention relates to a valve apparatus and a water heating apparatus including the same.

2. Description of the Background Art

A water heating apparatus is provided with a valve apparatus for adjusting a ratio of distribution to a bypass circuit and a heat exchanger. For example, Japanese Patent Laying-Open No. 4-141709 describes a valve apparatus. The valve apparatus described in this publication is a mixing valve having a valve shaft to which a valve element for hot water and a valve element for water are attached in a mixing chamber connected to both of a hot water flow path and a water flow path. By moving this valve shaft in an axial direction by rotation, opening of the valve element for hot water with respect to a valve seat for hot water and opening of the valve element for water with respect to a valve seat for water are adjusted to thereby control a ratio of mixing hot water and water.

With the valve apparatus described in the publication above, however, in order to control a ratio of mixing hot water and water, the valve shaft should be moved in the axial direction by rotating the valve shaft. Therefore, the valve shaft should be threaded and the valve shaft should be large in thickness. Thus, an O-ring to be fitted to an outer circumference of the valve shaft should also be large in size for use. Therefore, since resistance caused by the O-ring during rotation of the valve shaft is high, sliding torque becomes great. A large-sized motor is thus required for rotating the valve shaft, which may result in a large-sized and complicated apparatus.

SUMMARY OF THE INVENTION

The present invention was made in view of the problems above, and an object thereof is to provide a valve apparatus capable of adjusting a distribution ratio or a mixing ratio with a compact and simplified construction and a water heating apparatus having the same.

A valve apparatus according to the present invention includes a valve main body, a shaft body, a first valve element, and a second valve element. The valve main body includes a flow path having a first opening as well as a second opening and a third opening arranged such that the first opening lies therebetween. The shaft body is arranged in the flow path in the valve main body and constructed to be rotatable around an axial line. The first valve element is connected to the shaft body to be located between the first opening and the second opening in the flow path and it has a disc shape around the axial line as a center, with a first notch being formed therein. The second valve element is connected to the shaft body to be located between the first opening and the third opening in the flow path and it has a disc shape around the axial line as a center, with a second notch being formed therein. The valve apparatus is constructed such that an operation for opening and closing the first and second notches can be performed by rotating the first and second valve elements around the axial line.

According to the valve apparatus of the present invention, an operation for opening and closing the first and second notches can be performed by rotating the first and second valve elements, so that opening of the flow path between the first opening and the second opening and opening of the flow path between the first opening and the third opening can be adjusted. Therefore, a flow rate between the first opening and the second opening and a flow rate between the first opening and the third opening can simultaneously be controlled.

In addition, it is not necessary to move the first and second valve elements in the axial direction together with the shaft body in order to adjust opening above. Therefore, the shaft body does not have to be threaded and the shaft body can be made smaller in thickness, so that a drive source (such as a motor) for rotating the shaft body can be reduced in size. Therefore, a distribution ratio or a mixing ratio can be adjusted with a compact and simplified construction.

In the valve apparatus above, the first notch is arranged to be in point symmetry with the second notch, with respect to the axial line. Thus, by rotating the shaft body, change in opening of the flow path between the first opening and the second opening and opening of the flow path between the first opening and the third opening can readily be in symmetry with each other.

In the valve apparatus above, the first opening is an inlet port of a fluid into the flow path and each of the second and third openings is an outlet port of the fluid from the flow path, and the valve apparatus is constructed such that a ratio of an amount of flow-out from any one of the second and third openings to a total amount of flow-out from the second and third openings linearly varies with respect to the number of steps in rotation of the shaft body around the axial line in a control range of the apparatus. Since the ratio between the amounts of flow-out above linearly varies, an amount of change in distribution ratio with respect to an amount of change in the number of steps is constant and hence control of the distribution ratio is facilitated.

The valve apparatus above further includes a first shield portion arranged in the flow path such that the first notch of the first valve element can be opened and closed by rotation of the first valve element around the axial line and a second shield portion arranged in the flow path such that the second notch of the second valve element can be opened and closed by rotation of the second valve element around the axial line. Thus, an operation for opening and closing the first and second notches can be performed with a simplified construction.

The valve apparatus above has at least one construction of a construction in which the first valve element is arranged upstream of the first shield portion, in a flow of a fluid flowing through the flow path and a construction in which the second valve element is arranged upstream of the second shield portion, in the flow of the fluid flowing through the flow path. Therefore, the fluid which flows through the flow path presses the first valve element against the first shield portion and presses the second valve element against the second shield portion. Therefore, the first valve element and the first shield portion can be in intimate contact with each other and the second valve element and the second shield portion can be in intimate contact with each other. Thus, leakage of a fluid from between the first valve element and the first shield portion or from between the second valve element and the second shield portion can be suppressed. Therefore, the flow path can sufficiently be sealed.

In the valve apparatus above, the first shield portion is arranged to be in point symmetry with the second shield portion, with respect to the axial line. Thus, by rotating the shaft body, change in opening of the flow path between the first opening and the second opening and change in opening of the flow path between the first opening and the third opening can readily be in symmetry with each other.

In the valve apparatus above, a spacer having the first and second shield portions is provided separately from the valve main body and fixed to a wall surface of the flow path in the valve main body. Thus, assembly of the apparatus is enabled and facilitated, and the spacer can be prevented from rotating together with the shaft body when the shaft body rotates.

The valve apparatus above further includes at least one gap forming projection portion of a first gap forming projection portion provided in at least any part of opposing surfaces of the first valve element and the first shield portion and a second gap forming projection portion provided in at least any part of opposing surfaces of the second valve element and the second shield portion. Thus, the first gap forming projection portion can decrease an area where foreign matters are caught in the opposing surfaces of the first valve element and the first shield portion and the second gap forming projection portion can decrease an area where foreign matters are caught in the opposing surfaces of the second valve element and the second shield portion. Therefore, foreign matters being caught can be suppressed.

In the valve apparatus above, the first and second notches are constructed such that change in area of portions of the first and second notches which open in the respective first and second shield portions is in proportion to a square of an angle of rotation of the shaft body. Thus, a ratio of an amount of flow-out from any of the second and third openings to a total amount of flow-out from the second and third openings can linearly vary with respect to the number of steps in rotation of the shaft body within a control range of the valve apparatus. Control is thus facilitated.

In the valve apparatus above, at least one of the first and second notches is a notch opening formed to penetrate at least one valve element in a disc shape of the first and second valve elements while maintaining an outer shape of the disc shape of at least one valve element. Thus, since at least one of the first and second valve elements can maintain an outer shape in a disc shape, the entire outer circumference of the disc shape can extend along the wall surface in the flow path in the valve main body. Therefore, consideration only of axial accuracy of two parts of the valve main body and at least one valve element above will suffice, and strict axial accuracy of other parts is not necessary. In addition, since the entire outer circumference of the disc shape can extend along the wall surface of the flow path in the valve main body, rotation of at least one valve element can be stabilized.

In the valve apparatus above, a gap in a radial direction between an arc portion of any one of the first and second valve elements and a wall surface of the flow path is greater than a gap in the radial direction between an arc portion of any the other of the first and second valve elements and the wall surface of the flow path. Thus, on a valve element side where a gap in the radial direction above is great, wear due to contact between the valve element and the wall surface of the flow path can be prevented. In addition, on the valve element side where the gap in the radial direction is great, foreign matters are less likely to be bitten between the valve element and the wall surface of the flow path and a fluid readily flows through that gap. Thus, an effect of improvement in drainage performance is also obtained.

In addition, by connecting the flow path on the valve element side where the gap in the radial direction above is great to a heat exchanger side, a fluid can be supplied to the heat exchanger side even in such a state that a notch of that valve element is closed. Therefore, the fluid in the heat exchanger can be prevented from boiling or boiling dry. Moreover, by connecting the flow path on the valve element side where the gap in the radial direction above is small to a bypass circuit side, leakage of the fluid to the bypass circuit side while a notch in that valve element is closed can be suppressed. Thus, a distribution ratio (a flow rate to the bypass circuit side/a total flow rate) can be lowered so that delivery of hot water at a high temperature is allowed.

In the valve apparatus above, any one of the second and third openings and the first opening are provided in an orientation orthogonal to the axial line and any the other of the second and third openings is provided in an orientation in parallel to the axial line. Since this valve apparatus has such a construction that an operation for opening and closing the first and second notches can be performed by rotating the first and second valve elements, openings can be provided not only in an orientation orthogonal to the axial line as above but also in an orientation in parallel thereto. Thus, since an opening can be provided also in a parallel orientation, assembly at the time when the valve apparatus is incorporated in such equipment as a water heating apparatus is facilitated.

In the valve apparatus above, the flow path has a fourth opening between the second opening and the third opening. Thus, a water pressure introduction port of a backflow prevention apparatus can be connected to the fourth opening so that a stable water pressure of supplied water can be provided through the fourth opening.

A water heating apparatus according to the present invention is a water heating apparatus including any valve apparatus above, and at least one shield portion of the first and second shield portions has a disc shape around the axial line as a center, with a third notch being formed therein, and it is constructed such that the third notch is located in a lowermost portion of at least one shield portion while the valve apparatus is attached to the water heating apparatus.

According to the water heating apparatus of the present invention, a water heating apparatus capable of sufficiently sealing the flow path can be obtained. In addition, since the third notch is constructed to be located in the lowermost portion of at least one shield portion above, the fluid can be drained from the third notch located in the lowermost portion of the first shield portion. Therefore, drainage performance of the valve apparatus can be improved and thus freezing of remaining water can be less likely.

A water heating apparatus according to the present invention includes any valve apparatus above, a heat exchanger connected to any one of the second and third openings of the valve apparatus, and a bypass circuit connected to any the other of the second and third openings of the valve apparatus.

According to the water heating apparatus of the present invention, a flow rate to the heat exchanger side and a flow rate to the bypass circuit side can simultaneously be controlled and reduction in size of the apparatus can be achieved.

As described above, according to the present invention, a valve apparatus capable of adjusting a distribution ratio or a mixing ratio with a compact and simplified construction and a water heating apparatus having the same can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings.

First Embodiment

A construction of a valve apparatus and a stepping motor in the present embodiment will be described initially with reference to FIGS. 1 to 9.

Figure 1:
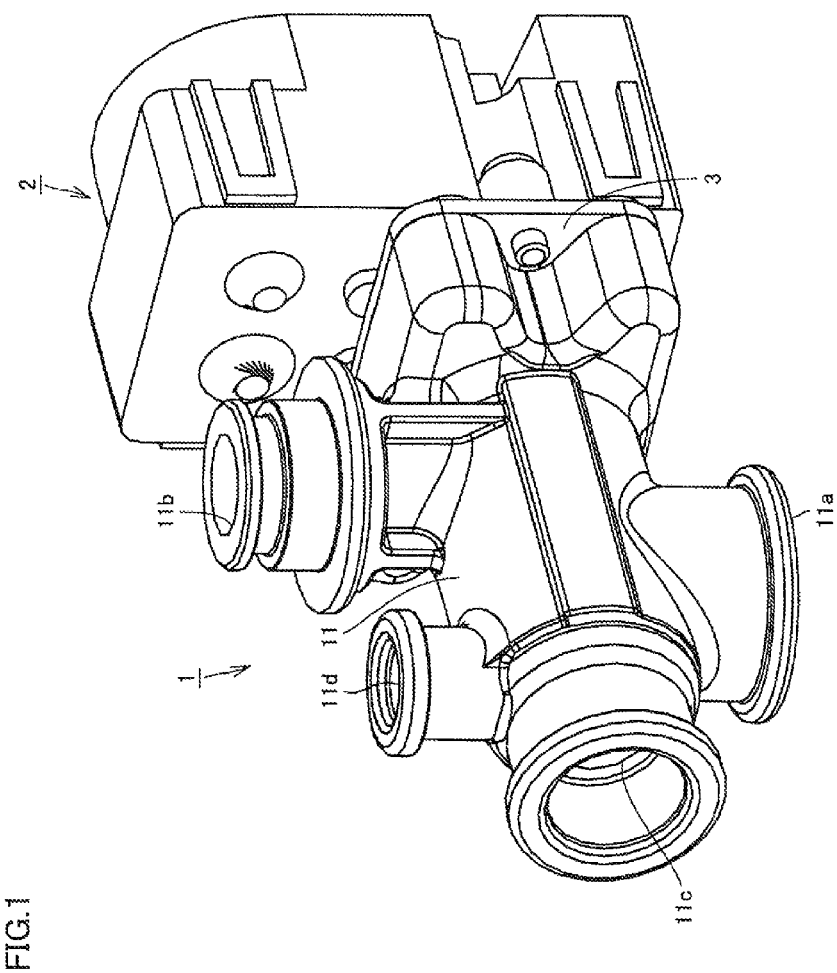
FIG. 1 is a perspective view schematically showing a construction of a valve apparatus and a stepping motor in a first embodiment of the present invention.

Referring mainly to FIG. 1, a stepping motor 2 is attached and fixed to a valve apparatus 1 in the present embodiment. As will be described later, a shaft body and a valve element in valve apparatus 1 are constructed to be rotatably driven by stepping motor 2.

Figure 2:
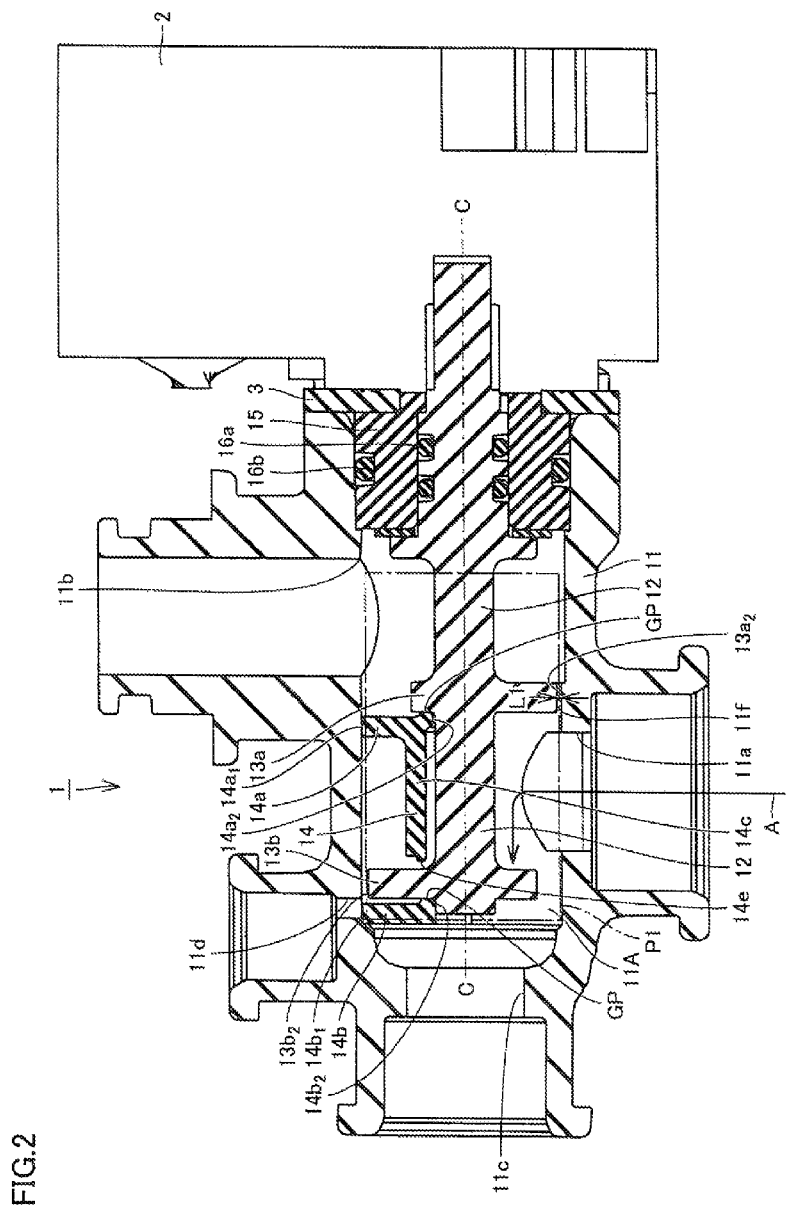
FIG. 2 is a diagram schematically showing a cross-section of a valve apparatus portion of the valve apparatus and the stepping motor shown in FIG. 1.
Figure 3:
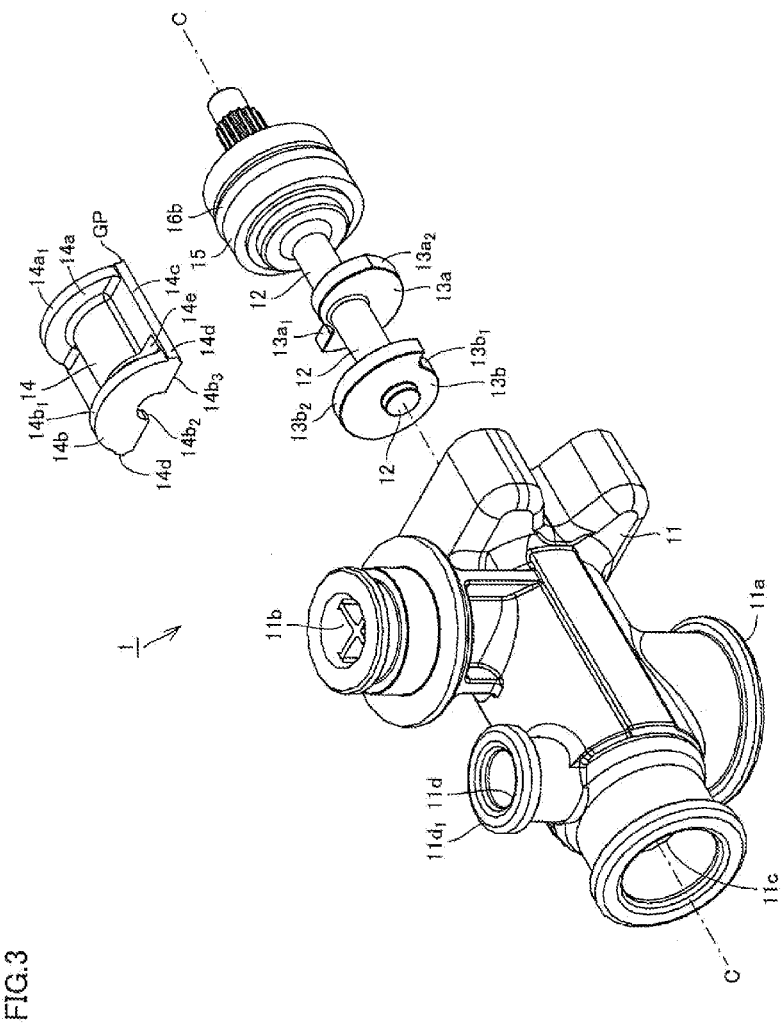
FIG. 3 is an exploded perspective view schematically showing a construction of the valve apparatus shown in FIG. 1.

Referring mainly to FIGS. 2 and 3, valve apparatus 1 in the present embodiment mainly has a valve main body 11, a shaft body 12, first and second valve elements 13a, 13b, a spacer 14, a valve collar 15, and O-rings 16a, 16b.

Valve main body 11 has a flow path 11A through which a fluid flows. Flow path 11A has a first opening 11a as well as a second opening 11b and a third opening 11c arranged such that first opening 11a lies therebetween.

In the case where this valve apparatus 1 serves as a distribution valve, first opening 11a is, for example, an inlet port of a fluid (such as hot water and water) and each of second and third openings 11b, 11c is, for example, an outlet port of the fluid. Alternatively, in the case where valve apparatus 1 serves as a mixing valve, first opening 11a is, for example, an outlet port of the fluid, and each of second and third openings 11b, 11c is, for example, an inlet port of the fluid.

In addition, flow path 11A may have a fourth opening 11d between second opening 11b and third opening 11c. Fourth opening $11d$ may be formed to communicate with flow path 11A. In the case where valve apparatus 1 serves as a distribution valve, this fourth opening $11d$ is preferably an outlet port of the fluid.

Shaft body 12 is arranged in flow path 11A in valve main body 11 and constructed to be rotatable around a virtual axial line C-C. Namely, shaft body 12 is rotatable around axial line C-C as it is attached to valve main body 11 with valve collar 15 attached to an outer circumferential portion on one end side of shaft body 12 being interposed.

O-ring $16a$ is arranged between shaft body 12 and valve collar 15, and O-ring $16b$ is arranged between valve collar 15 and valve main body 11. In addition, shaft body 12 is constructed such that stepping motor (drive source) 2 can provide rotational driving force thereto. Specifically, stepping motor 2 is connected to one end of shaft body 12 in a direction of axial line C-C. This stepping motor 2 is attached and fixed to valve main body 11 with a servo attachment plate 3 being interposed.

Each of first and second valve elements $13a$, $13b$ is attached to shaft body 12. First valve element $13a$ is located between first opening $11a$ and second opening $11b$ in flow path 11A. Second valve element $13b$ is located between first opening $11a$ and third opening $11c$ in flow path 11A.

Figure 4:
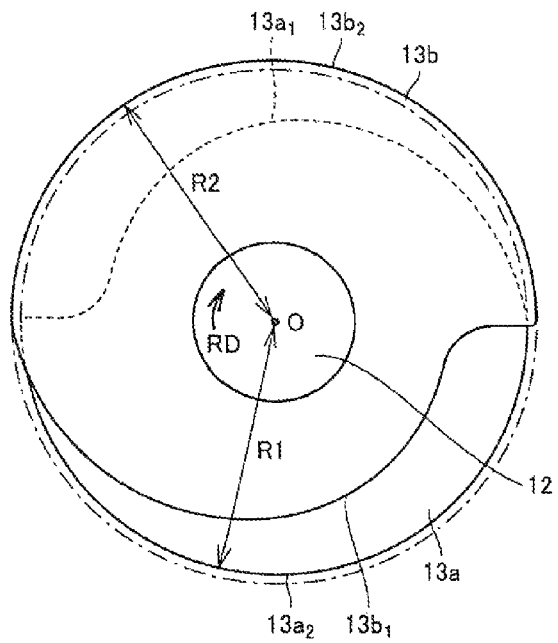
FIG. 4 is a diagram for illustrating a shape of first and second valve elements used for the valve apparatus shown in FIG. 1.

Referring mainly to FIG. 4, first valve element $13a$ has a disc shape around axial line C-C defined as a center O, with a first notch $13a_1$ being formed therein. This first notch $13a_1$ is provided in an angular range of approximately 180° around center O of disc-shaped first valve element $13a$. A portion $13a_2$ of first valve element $13a$ where first notch $13a_1$ is not provided has an arc shape. In addition, a portion of first valve element $13a$ provided with first notch $13a_1$ has an outer shape, for example, resembling an involute curve.

Likewise first valve element $13a$, second valve element $13b$ also has a disc shape around axial line C-C as center O, with a second notch $13b_1$ being formed therein. This second notch $13b_1$ is provided in an angular range of approximately 180° around center O of disc-shaped second valve element $13b$. A portion $13b_2$ of second valve element $13b$ where second notch $13b_1$ is not provided has an arc shape. In addition, a portion of second valve element $13b$ provided with second notch $13b_1$ has an outer shape, for example, resembling an involute curve.

Specifically, first and second notches $13a_1$, $13b_1$ have such a shape that change in area of portions of first and second notches $13a_1$, $13b_1$ opening in respective first and second shield portions $14a$, $14b$ is in proportion to a square of an angle of rotation of shaft body 12 when shaft body 12 is rotated in a direction of an arrow RD in FIG. 4.

Since both of first and second valve elements $13a$, $13b$ are attached to a single shaft body 12, center O of first valve element $13a$ and center O of second valve element $13b$ are located on the same axial line (straight line) C-C. A radius R1 from center O to arc portion $13a_2$ of first valve element $13a$ may be the same as or different from a radius R2 from center O to arc portion $13b_2$ of second valve element $13b$. In the present embodiment, radius R1 is smaller than radius R2.

First notch $13a_1$ is preferably arranged to be in point symmetry with second notch $13b_1$, with respect to axial line C-C as center O, when viewed in the direction of axial line C-C. As described above, in the present embodiment, in the case where radius R1 is smaller than radius R2, the shape of first valve element $13a$ when viewed in the direction of axial line C-C is similar to the shape of second valve element $13b$.

Figure 5:
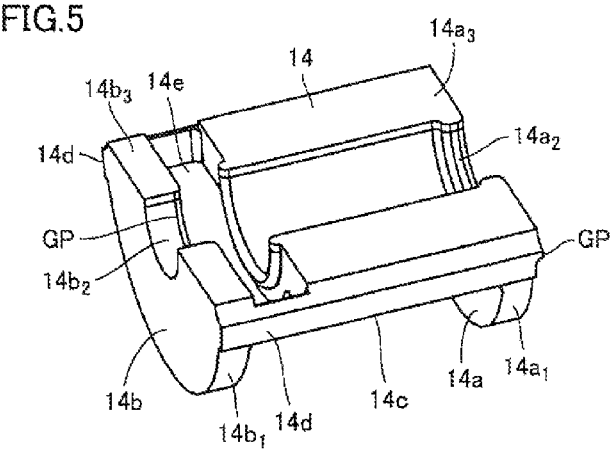
FIG. 5 is a perspective view schematically showing from below a construction of a spacer used for the valve apparatus shown in FIG. 1.

Referring mainly to FIGS. 3 and 5, spacer 14 mainly has first and second shield portions $14a$, $14b$, a coupling portion $14c$, and two projected engagement portions $14d$. First shield portion $14a$ is arranged in flow path 11A so as to be able to open and close first notch $13a_1$ of first valve element $13a$ as first valve element $13a$ rotates around axial line C-C. In addition, second shield portion $14b$ is arranged in flow path 11A so as to be able to open and close second notch $13b_1$ of second valve element $13b$ as second valve element $13b$ rotates around axial line C-C.

Each of first and second shield portions $14a$, $14b$ has, for example, a semi-circular shape. Each of outer circumferential end surfaces $14a_1$, $14b_1$ in a semi-circular shape of respective first and second shield portions $14a$, $14b$ is a portion abutting to a wall surface of flow path 11A (hereinafter also referred to as a "wall surface of the flow path") and each of inner circumferential end surfaces $14a_2$, $14b_2$ is a portion abutting to an outer circumferential surface of shaft body 12.

First and second shield portions $14a$, $14b$ can also be regarded as having such a shape that third semi-circular notches $14a_3$, $14b_3$ are formed in a disc shape around axial line C-C as the center. These third notches $14a_3$, $14b_3$ are provided in an angular range of approximately 180° around axial line C-C. First and second shield portions $14a$, $14b$ are constructed such that third notches $14a_3$, $14b_3$ are located in the lowermost portions of first and second shield portions $14a$, $14b$ respectively while valve apparatus 1 is attached to a water heating apparatus which will be described later. Here, the lowermost portion refers to a portion located lowest in a vertical direction.

Coupling portion $14c$ is a portion connected to both of first and second shield portions $14a$, $14b$ and it has a semi-cylindrical shaped portion covering an outer circumferential surface of shaft body 12 along the same.

In coupling portion $14c$, a through hole $14e$ extending in a direction orthogonal to the direction of axial line C-C is formed. Two projected engagement portions $14d$ are arranged on respective opposing end portions of coupling portion $14c$, and they project outward from the outer circumferential end portions of both of first and second shield portions $14a$, $14b$ and extend in the direction of axial line C-C.

Figure 6:
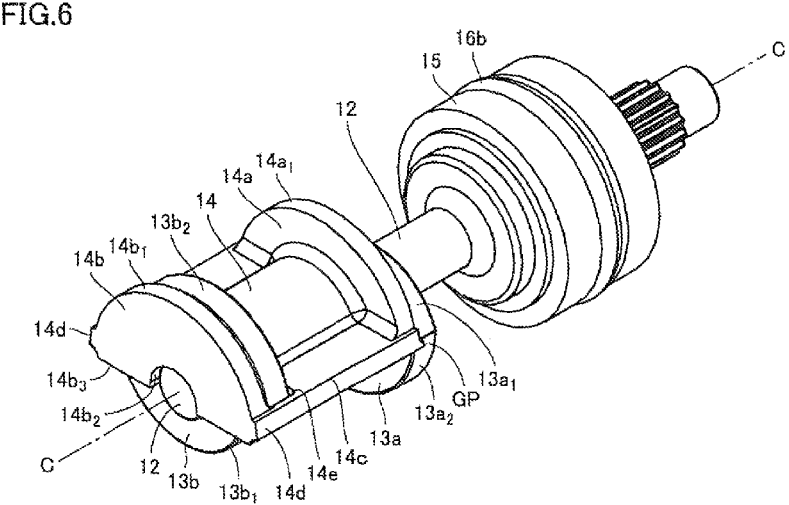
FIG. 6 is a perspective view schematically showing such features as a shaft body, a valve element, and a spacer used for the valve apparatus shown in FIG. 1.

Referring mainly to FIGS. 2 and 6, spacer 14 is attached to shaft body 12 by being sandwiched between first valve element $13a$ and second valve element $13b$ and inserting second valve element $13b$ into through hole $14e$. In this attached state, the semi-cylindrical shaped portion of coupling portion $14c$ covers the outer circumferential surface of shaft body 12 along the same. In addition, in this attached state, first and second shield portions $14a$, $14b$ are located in the same direction with respect to axial line C-C.

By rotating shaft body 12 with respect to spacer 14 in this attached state, first shield portion $14a$ can open and close first notch $13a_1$ and second shield portion $14b$ can open and close second notch $13b_1$. Then, since first and second notches $13a_1$, $13b_1$ are located in a direction different from each other with respect to axial line C-C and first and second shield portions $14a$, $14b$ are located in the same direction with respect to axial line C-C, second shield portion $14b$ can open second notch $13b_1$ while first shield portion $14a$ closes first notch $13a_1$. In contrast, second shield portion $14b$ can also close second notch $13b_1$ while first shield portion $14a$ opens first notch $13a_1$.

Figure 7:
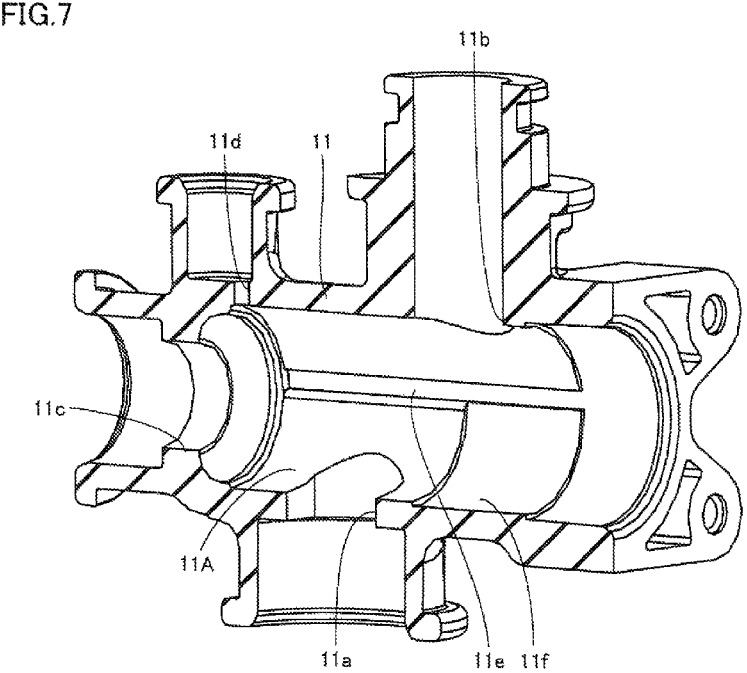
FIG. 7 is a cut-away perspective view of a valve main body used for the valve apparatus shown in FIG. 1.
Figure 8:
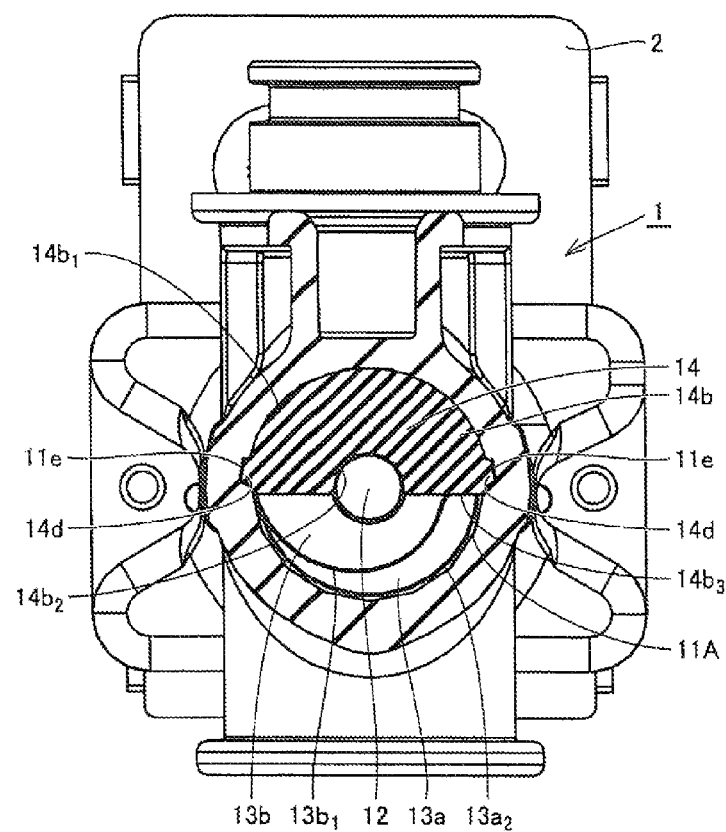
FIG. 8 is a cross-sectional view showing a manner in which the spacer is fixed to the valve main body in the valve apparatus shown in FIG. 1.

Referring mainly to FIGS. 7 and 8, a linear groove $11e$ extending in a direction of extension of axial line C-C is formed in the wall surface of the flow path in valve main body 11. Spacer 14 can be fixed to the wall surface of the flow path as it is guided by groove $11e$ and inserted in flow path 11A while projected engagement portion $14d$ is fitted in groove $11e$. Namely, in such a state that spacer 14 is inserted in flow path 11A, each of projected engagement portions $14d$ on the opposing sides of spacer 14 is fitted into groove 11e, and hence spacer 14 does not rotate together with shaft body 12 even though shaft body 12 rotates around axial line C-C.

Figure 9:
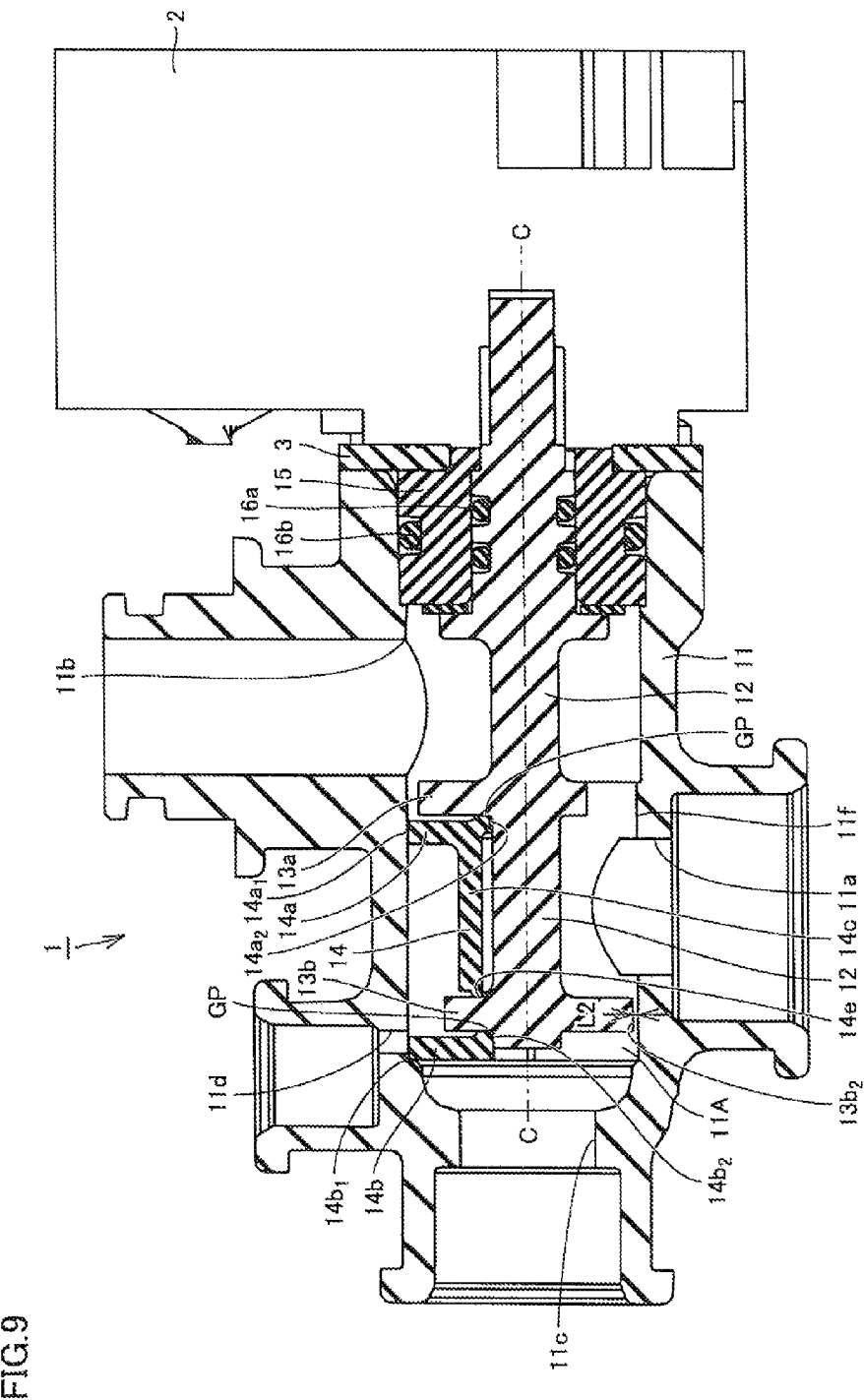
FIG. 9 is a cross-sectional view for illustrating a gap in a radial direction between the valve element and a wall surface of a flow path in the valve main body in the valve apparatus shown in FIG. 1.

Referring mainly to FIGS. 7 and 9, a groove 11f extending in an angular range of approximately 180° along a circumferential direction is formed in the wall surface of the flow path in valve main body 11.

It is noted that, preferably, first, second, and fourth openings 11a, 11b, 11d are provided in an orientation orthogonal to axial line C-C and third opening 11c is provided in an orientation in parallel thereto.

A material for valve main body 11, shaft body 12, first and second valve elements 13a, 13b, spacer 14, and valve collar 15 is, for example, a resin such as PPS (polyphenylene sulfide), and servo attachment plate 3 is formed, for example, from a zinc-plated steel plate. In addition, first and second valve elements 13a, 13b may be formed integrally with shaft body 12 or may be formed separately from shaft body 12 and then attached and fixed to shaft body 12.

A construction of a water heating apparatus having valve apparatus 1 according to the present embodiment will now be described with reference to FIG. 10.

Figure 10:
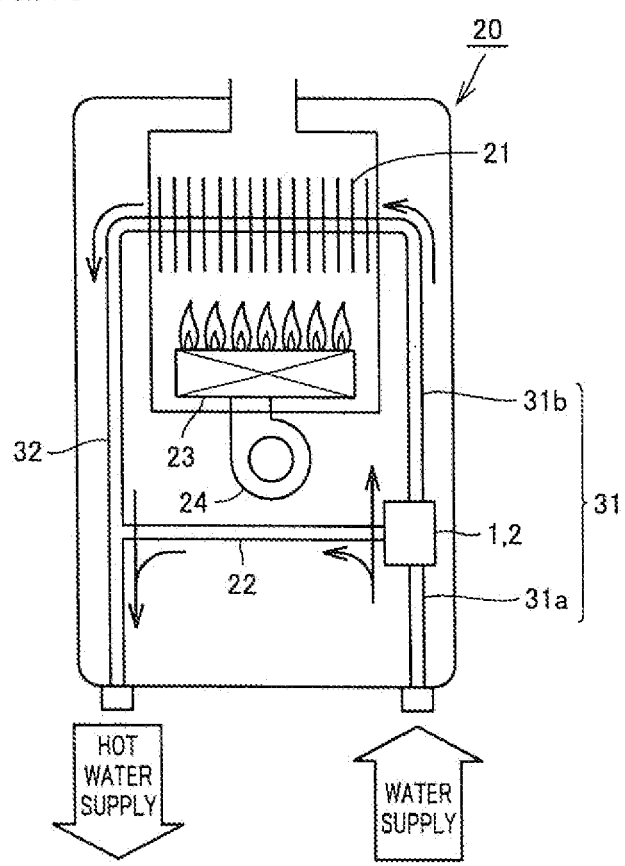
FIG. 10 is a diagram schematically showing a construction of a water heating apparatus provided with the valve apparatus shown in FIG. 1.

Referring to FIG. 10, a water heating apparatus 20 mainly has valve apparatus 1, stepping motor 2, a heat exchanger 21, a bypass circuit 22, a burner 23, a fan 24, a water supply pipe 31, and a hot water delivery pipe 32.

Water supply pipe 31 for supplying water to heat exchanger 21 and hot water delivery pipe 32 for delivering hot water from the heat exchanger are connected to heat exchanger 21. Bypass circuit (bypass pipe) 22 connects these water supply pipe 31 and hot water delivery pipe 32 to each other.

Heat exchanger 21 serves to carry out heat exchange with a combustion gas generated in burner 23 and fan 24 serves to supply air necessary for combustion to burner 23. Valve apparatus 1 in the present embodiment having the features shown in FIGS. 1 to 9 is connected, for example, to a portion of connection between water supply pipe 31 and bypass circuit 22.

Referring mainly to FIGS. 2 and 10, first opening 11a of valve apparatus 1 is connected to a water supply side portion 31a of water supply pipe 31, and second opening 11b is connected to a heat exchanger side portion 31b of water supply pipe 31. In addition, third opening 11c is connected to bypass circuit 22. It is noted that fourth opening 11d is preferably connected to a backflow prevention apparatus or the like having a water pressure introduction port included in a water heating apparatus with bath re-heat function in the case where this valve apparatus 1 is used in a water heating apparatus with bath re-heat function or the like. Details of a construction where valve apparatus 1 is used in a water heating apparatus with bath re-heat function will be described later.

Since valve apparatus 1 is arranged at the portion of connection between water supply pipe 31 and bypass circuit 22 in this water heating apparatus 20, a ratio of distribution to heat exchanger 21 and bypass circuit 22 can be adjusted by valve apparatus 1.

Namely, in water heating apparatus 20, water entering the apparatus is once distributed to a heat exchanger 21 side and a bypass circuit 22 side, and water at a high temperature that has passed through heat exchanger 21 and water at a low temperature that has passed through bypass circuit 22 are mixed to thereby obtain a desired temperature of delivered hot water. Here, by adjusting a distribution ratio by valve apparatus 1, control to a desired temperature of delivered hot water is allowed.

An operation of valve apparatus 1 according to the present embodiment will be described next with reference to FIGS. 11(A) to 11(C).

Referring to FIG. 11(A), this state shows such a state that entire first notch $13a_1$ of first valve element 13a is open without being covered with first shield portion 14a (fully open) and entire second notch $13b_1$ of second valve element 13b is covered with and closed by second shield portion 14b (fully closed). In this state, as shown in FIG. 9, a fluid (such as hot water and water) can flow between first opening 11a and second opening 11b, however, flow of a fluid between first opening 11a and third opening 11c is cut off.

It is noted that, in FIG. 11(A), a portion not covered with first and second shield portions 14a, 14b but opening in the portion where first and second notches $13a_1$, $13b_1$ are formed is hatched in the figure. This hatching is similarly provided also in FIGS. 11(B) and 11(C).

Referring to FIG. 11(B), this state is such a state that shaft body 12 is turned clockwise from the state in FIG. 11(A) by approximately 90° in the figure as shown with arrow RD. In this state, though a part of first notch $13a_1$ of first valve element 13a is covered with first shield portion 14a, a remaining portion is not covered with first shield portion 14a but is open. In addition, though a part of second notch $13b_1$ of second valve element 13b is covered with second shield portion 14b, a remaining portion is not covered with second shield portion 14b but is open. Namely, a part of both of first and second notches $13a_1$, $13b_1$ is open. Therefore, in this state, a prescribed amount of fluid can flow between first opening 11a and second opening 11b, and a prescribed amount of fluid can flow also between first opening 11a and third opening 11c.

Referring to FIG. 11(C), this state is such a state that shaft body 12 is turned clockwise from the state in FIG. 11(B) further by approximately 90° in the figure as shown with arrow RD. In this state, entire first notch $13a_1$ of first valve element 13a is covered with and closed by first shield portion 14a (fully closed) and entire second notch $13b_1$ of second valve element 13b is open without being covered with second shield portion 14b (fully open). In this state, as shown in FIG. 2, main flow of a fluid is cut off between first opening 11a and second opening 11b, and a fluid can flow between first opening 11a and third opening 11c.

By thus rotating shaft body 12, an operation for opening and closing first and second notches $13a_1$, $13b_1$ can be performed. Thus, opening of the flow path between first opening 11a and second opening 11b and opening of the flow path between first opening 11a and third opening 11c can be adjusted. Therefore, a flow rate between first opening 11a and second opening 11b and a flow rate between first opening 11a and third opening 11c can simultaneously be controlled.

A function and effect of the present embodiment will now be described.

According to valve apparatus 1 in the present embodiment, as described above, an operation for opening and closing first and second notches $13a_1$, $13b_1$ can be performed by rotating shaft body 12. Thus, opening of the flow path between first opening 11a and second opening 11b and opening of the flow path between first opening 11a and third opening 11c can be adjusted. Therefore, a flow rate between first opening 11a and second opening 11b and a flow rate between first opening 11a and third opening 11c can simultaneously be controlled. Therefore, by employing this valve apparatus 1 in water heating apparatus 20 as shown in FIG. 10, a can body flow rate (a flow rate in heat exchanger 21) and a bypass flow rate (a flow rate in the bypass circuit) can simultaneously be controlled.

In addition, in order to adjust opening above, first and second valve elements 13a, 13b should only be rotated and it is not necessary to move first and second valve elements 13a, 13b in the direction of axial line C-C. Namely, opening above of first and second valve elements 13a, 13b can be adjusted only by rotation. Thus, it is not necessary to thread shaft body 12 in order to move shaft body 12 in the direction of axial line C-C, and shaft body 12 can be smaller in thickness. Therefore, stepping motor 2 for rotating shaft body 12 can be reduced in size. A distribution ratio or a mixing ratio can thus be adjusted while valve apparatus 1 is constructed to be compact and simplified. Therefore, water heating apparatus 20 including this valve apparatus 1 can also be reduced in size.

Moreover, first notch $13a_1$ is arranged to be in point symmetry with second notch $13b_1$, with respect to axial line C-C as center O. Thus, by rotating shaft body 12, change in opening of the flow path between first opening 11a and second opening 11b and change in opening of the flow path between first opening 11a and third opening 11c can readily be in symmetry with each other.

Furthermore, spacer 14 having first and second shield portions 14a, 14b is provided separately from valve main body 11 and fixed to the wall surface of the flow path in valve main body 11. Thus, assembly of valve apparatus 1 where two valve elements 13a, 13b are joined to a single shaft body 12 is enabled and facilitated, and spacer 14 can be prevented from rotating together with shaft body 12 when shaft body 12 rotates.

Namely, in the case where first and second shield portions 14a, 14b are formed integrally with valve main body 11, even though insertion of two valve elements 13a, 13b joined to a single shaft body 12 into flow path 11A is attempted, first and second shield portions 14a, 14b in flow path 11A block entry of the valve elements. Therefore, two valve elements 13a, 13b joined to a single shaft body 12 cannot be inserted in flow path 11A and valve apparatus 1 cannot be assembled.

In contrast, in the present embodiment, spacer 14 having first and second shield portions 14a, 14b is formed separately from valve main body 11 and inserted in flow path 11A while it is assembled to shaft body 12 and valve elements 13a, 13b. Thus, insertion of first and second valve elements 13a, 13b in flow path 11A is not blocked by first and second shield portions 14a, 14b. Therefore, valve apparatus 1 in which two valve elements 13a, 13b are joined to a single shaft body 12 can be assembled.

Additionally, as shown in FIG. 8, two projected engagement portions 14d provided at respective opposing end portions of spacer 14 are fitted in grooves 11e provided in the wall surface of the flow path. Therefore, spacer 14 is prevented from rotating together with shaft body 12 when shaft body 12 rotates. Thus, an operation for opening and closing first and second notches $13a_1$, $13b_1$ can accurately be performed.

Moreover, since first and second notches $13a_1$, $13b_1$ can be opened and closed by first and second shield portions 14a, 14b provided in spacer 14, an operation for opening and closing first and second notches $13a_1$, $13b_1$ can be performed with a simplified construction.

Furthermore, first and second openings 11a, 11b are provided in an orientation orthogonal to axial line C-C, and third opening 11c is provided in an orientation in parallel to axial line C-C. As described above, since this valve apparatus 1 has such a construction that an operation for opening and closing first and second notches $13a_1$, $13b_1$ can be performed by rotating first and second valve elements 13a, 13b, third opening 11c can be provided not only in an orientation orthogonal to axial line C-C as above but also in an orientation in parallel thereto. Then, since third opening 11c can be provided also in a parallel orientation, assembly at the time when valve apparatus 1 is incorporated in such equipment as water heating apparatus 20 is facilitated.

Though a case where first and second notches $13a_1$, $13b_1$ are located in directions different from each other with respect to axial line C-C and first and second shield portions 14a, 14b are located in the same direction with respect to axial line C-C has been described in the present embodiment, first and second notches $13a_1$, $13b_1$ may be located in the same direction with respect to axial line C-C and first and second shield portions 14a, 14b may be located in directions different from each other with respect to axial line C-C. In this case, first shield portion 14a is preferably arranged in point symmetry with second shield portion 14b, with respect to axial line C-C as center O. In this case as well, by rotating shaft body 12, change in opening of the flow path between first opening 11a and second opening 11b and change in opening of the flow path between first opening 11a and third opening 11c can be and can readily be in symmetry with each other.

Figure 11:
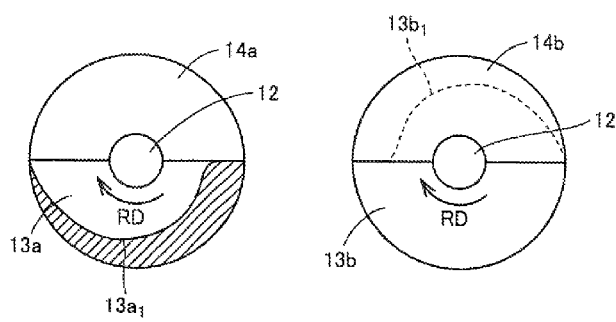
FIGS. 11(A) to 11(C) are diagrams for illustrating an operation of the valve apparatus shown in FIG. 1.
Figure 11:
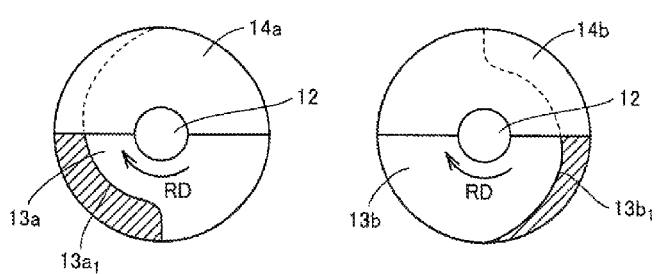
Figure 11:
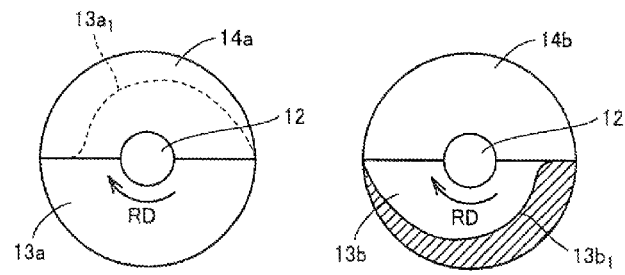

In addition, as shown in FIG. 11, so long as second shield portion 14b can open second notch $13b_1$ when first shield portion 14a closes first notch $13a_1$ and second shield portion 14b can close second notch $13b_1$ when first shield portion 14a opens first notch $13a_1$, positions of first and second notches $13a_1$, $13b_1$ and first and second shield portions 14a, 14b are not particularly restricted.

Second Embodiment

Valve apparatus 1 in the present embodiment is characterized by a shape of first and second notches $13a_1$, $13b_1$.

In the present embodiment, each of a portion of first valve element 13a provided with first notch $13a_1$ and a portion of second valve element 13b provided with second notch $13b_1$ has an outer shape resembling an involute curve as shown in FIG. 4. Specifically, when shaft body 12 is rotated as shown in FIG. 11, first and second notches $13a_1$, $13b_1$ have such a shape that change in area of portions of first and second notches $13a_1$, $13b_1$ opening in respective first and second shield portions 14a, 14b (hatched regions in FIG. 11) is in proportion to a square of an angle of rotation θ of shaft body 12.

Thus, in the case where valve apparatus 1 is attached to water heating apparatus 20 as shown in FIG. 10, a ratio of an amount of flow-out from third opening 11c to the total amount of flow-out from second and third openings 11b, 11c (bypass flow rate/total flow rate) can linearly vary with respect to the number of steps in rotation of shaft body 12 within a control range of valve apparatus 1, which will be described below in detail.

Initially, the present inventors have considered how first and second notches $13a_1$, $13b_1$ should be shaped in order to linearly vary the ratio above (the bypass flow rate/the total flow rate) with respect to the number of steps in rotation of shaft body 12 within the control range of valve apparatus 1, as follows.

Figure 12:
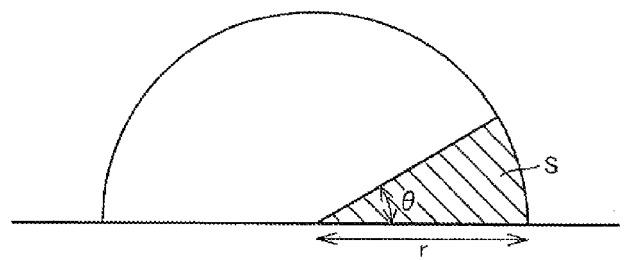
FIG. 12 is a diagram for illustrating relation between a shape of a notch provided in the valve element and a flow rate.

Referring to FIG. 12, when an area in a circle having a radius r at an angle θ (an area of a hatched portion) is denoted as S, S is defined as an area through which a fluid passes, Q is defined as a flow rate of that fluid, and v is defined as an average velocity of flow of that fluid, Equation (1) below is derived from relation among S, Q, and v.

$$Q = \int v s dS \qquad (1)$$

$$= \int v r \cdot dr \cdot d\theta$$

$$= \int v \cdot \frac{r^2}{2} \cdot d\theta$$

Here, if Q above can be approximated to Equation (2) below, Equation (1) above can be expressed in Equation (3) below.

$$Q = \frac{a\theta + b}{\theta - c} \quad (a, b, c; \text{constant}) \tag{2}$$

$$\int v \cdot \frac{r^2}{2} \cdot d\theta = \frac{a\theta + b}{\theta - c} \tag{3}$$

When both sides of Equation (3) above are differentiated with respect to θ, Equation (4) below is obtained. It is noted that C in Equation (4) is a constant.

$$\frac{vr^2}{2} = \frac{-ac - b}{(\theta - c)^2} \tag{4}$$

$$\therefore v(\theta) = \frac{C}{(\theta - c)^2 r^2}$$

It can be assumed from this Equation (4) that average velocity of flow v is in inverse proportion to a square of angle of rotation θ and radius r. Here, since characteristics of flow rate Q are desirably linear (Q=Aθ+B), flow rate Q is assigned to this linear equation and it can be expressed as follows. It is noted that A, B above are constants.

$$Q = A\theta + B$$

$$\Leftrightarrow \int v dS = A\theta + B$$

When Equation (4) above is substituted in the assigned equation above and then it is deformed to dS=(dS/dθ)·dθ in order to calculate dS/dθ, Equation (5) below is obtained. It is noted that dS/dθ expresses change in area with respect to change in angle.

$$\int \frac{C}{(\theta - c)^2 r^2} \cdot \frac{dS}{d\theta} \cdot d\theta = A\theta + B \tag{5}$$

When both sides of this Equation (5) are differentiated with respect to θ, Equation (6) below is obtained.

$$\frac{C}{(\theta - c)^2 r^2} \cdot \frac{dS}{d\theta} = A \tag{6}$$

$$\frac{dS}{d\theta} = \frac{A}{C} r^2 \cdot (\theta - c)^2$$

$$S = \frac{A}{3C} r^2 \cdot (\theta - c)^3$$

From Equation (6) above, it was found that, in order for characteristics of flow rate Q to be linear (Q=Aθ+B), area S should be in proportion to a cube of angle of rotation θ and an amount of change caused by rotation of area S through which a fluid passes should be in proportion to a square of angle of rotation θ. Therefore, it was found that each of a portion of first valve element 13*a* provided with first notch 13*a*$_1$ and a portion of second valve element 13*b* provided with second notch 13*b*$_1$ should have an outer shape resembling an involute curve as shown in FIG. 4.

In addition, the present inventors have studied a distribution ratio (a bypass flow rate/a total flow rate) when a shape of first and second notches 13*a*$_1$, 13*b*$_1$ is changed, in order to confirm the matters above. Contents and results thereof will be described below with reference to FIGS. 13 to 15.

Figure 13:
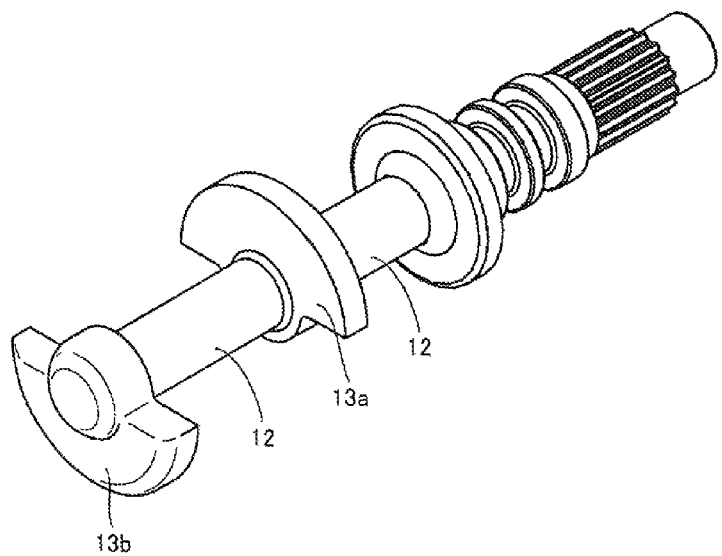
FIG. 13 is a schematic perspective view showing a construction in the case where the valve element has a semi-circular shape.
Figure 14:
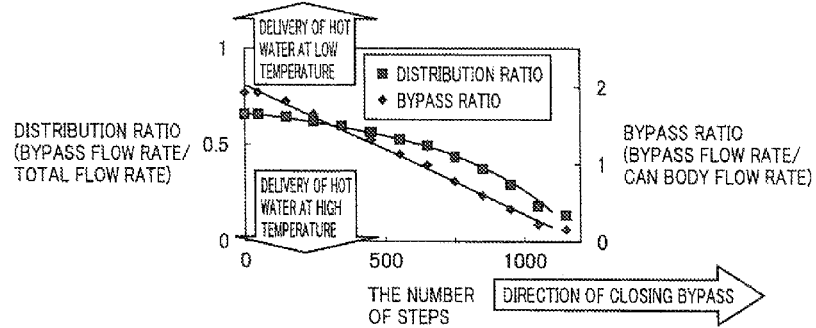
FIG. 14 is a diagram showing relation between the number of steps and a distribution ratio or a bypass ratio in the case where a semi-circular valve element having a notch shown in FIG. 13 is employed.
Figure 15:
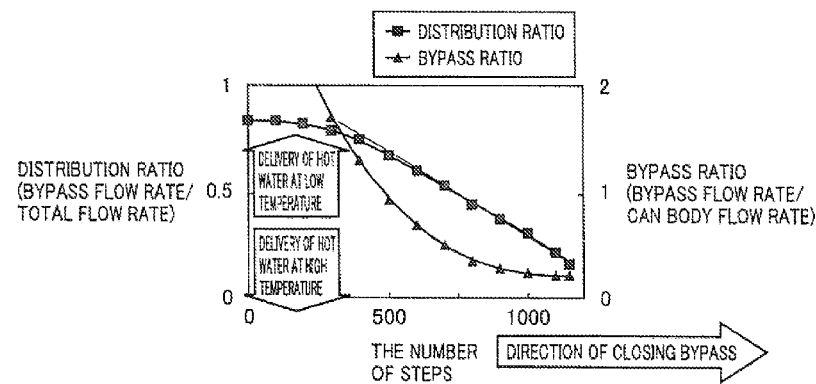
FIG. 15 is a diagram showing relation between the number of steps and a distribution ratio or a bypass ratio in the case where the valve element having the notch in the shape shown in FIG. 4 is employed.

The present inventors have studied a distribution ratio (a bypass flow rate/a total flow rate) and a bypass ratio (a bypass flow rate/a can body flow rate) with respect to the number of steps in rotation, in both of a case where each of first and second valve elements 13*a*, 13*b* is semi-circular as shown in FIG. 13 and a case where it has an outer shape resembling an involute curve as shown in FIG. 4 (such an outer shape that change in area of an opening is in proportion to a square of an angle of rotation). FIGS. 14 and 15 show results.

From the results in FIG. 14, it was confirmed that, in the case where each of first and second valve elements 13*a*, 13*b* was semi-circular as shown in FIG. 13, a distribution ratio exhibited a curve inversely proportional to an angle of rotation (the number of steps). In this case, relation between an angle of rotation and a distribution ratio is curved and difficult to grasp. Therefore, if such valve apparatuses are mass produced and individual apparatuses are varied, control of a distribution ratio becomes difficult. It is noted that a bypass ratio can advantageously be approximated to a straight line.

On the other hand, it was confirmed from the results in FIG. 15 that, in the case where an outer shape resembling an involute curve as shown in FIG. 4 was set, a distribution ratio could be in straight-line approximation to an angle of rotation (the number of steps). In this case, relation between an angle of rotation and a distribution ratio is linear and easy to grasp. Therefore, even if such valve apparatuses are mass produced and individual apparatuses are varied, a distribution ratio can readily be found from an angle of rotation and control of a distribution ratio is facilitated.

It is noted that a control range in which a distribution ratio can linearly be approximated above is preferably such that a distribution ratio is within a range from 0.15 to 0.75. In general, a temperature of water entering the heat exchanger is from 5° C. to 25° C., and it is desired that a temperature of hot water delivered from the water heating apparatus is from 32° C. to 60° C. In this case, in order to raise a lowest temperature of incoming water 5° C. to a highest temperature of delivered hot water 60° C., normally, a can body temperature (a temperature of heat exchanger 21) should be approximately 70° C., and in order to realize that can body temperature, a distribution ratio above should be approximately 0.15. Alternatively, in order to raise a highest temperature of incoming water 25° C. to a lowest temperature of delivered hot water 32° C., normally, a can body temperature should be approximately 50° C., and in order to realize that can body temperature, a distribution ratio above should be approximately 0.75. Therefore, in order to facilitate control of a distribution ratio within the range in which general demand above can be met, a distribution ratio should only linearly be approximated within the range of the distribution ratio from 0.15 to 0.75.

A function and effect of the present embodiment will now be described.

In water heating apparatus 20 shown in FIG. 10, water which enters apparatus 20 is once distributed to the heat exchanger 21 side and the bypass circuit 22 side and water at a high temperature that has passed through heat exchanger 21 and water at a low temperature that has passed through bypass circuit 22 are mixed with each other, to thereby obtain a desired temperature of delivered hot water. Therefore, a valve apparatus incapable of controlling a distribution ratio or a valve apparatus incapable of accurately knowing a distribution ratio in spite of its ability to control a distribution ratio cannot obtain an appropriate temperature of delivered hot water. In addition, in the case where valve apparatuses are mass produced, when an assembly error or the like is caused for each individual apparatus, a temperature of delivered hot water also varies.

According to the present embodiment, since relation between an angle of rotation and a distribution ratio is linear and easy to grasp within the control range of valve apparatus 1 as described above, it is easy to know a distribution ratio from an angle of rotation. In addition, even if such valve apparatuses 1 are mass produced and an assembly error or the like is caused for each individual apparatus, a distribution ratio can readily be found from an angle of rotation and hence control of a distribution ratio is facilitated. Thus, a water heating apparatus having good hot water delivery characteristics can be obtained.

In addition, in the case where each of first and second valve elements 13a, 13b shown in FIG. 13 is semi-circular, a bypass ratio can readily be known from an angle of rotation because relation between a bypass ratio and an angle of rotation is linear under the control with a bypass ratio serving as the reference. Control is facilitated in this regard.

Third Embodiment

Valve apparatus 1 in the present embodiment is characterized in that a size L1 of a gap in a radial direction between arc portion $13a_2$ of first valve element 13a and the wall surface of the flow path shown in FIG. 2 is greater than a size L2 of a gap in the radial direction between arc portion $13b_2$ of second valve element 13b and the wall surface of the flow path shown in FIG. 9.

In order to make size L1 of the gap greater than size L2 of the gap, radius R1 of arc portion $13a_2$ of first valve element 13a may be made smaller than radius R2 of arc portion $13b_2$ of second valve element 13b as shown in FIG. 4, or groove 11f extending in a circumferential direction may be formed in the wall surface of the flow path in the portion where first valve element 13a is located as shown in FIG. 7. Alternatively, a construction where radius R1 is made smaller than radius R2 and a construction where groove 11f is formed may be combined.

Specifically, size L1 of the gap in the radial direction between arc portion $13a_2$ of the first valve element and the wall surface of flow path 11A is, for example, approximately 0.n mm (a few tenths of a millimeter) and size L2 of the gap in the radial direction between arc portion $13b_2$ of the second valve element and the wall surface of flow path 11A is, for example, approximately 0.0n mm (a few hundredths of a millimeter).

As shown in FIG. 9, when second notch $13b_1$ on the bypass side (third opening 11c side) is fully closed, first notch $13a_1$ on the heat exchanger side (second opening 11b side) is fully open. In this case, there is substantially no flow rate toward the bypass side, and therefore the distribution ratio (the bypass flow rate/the total flow rate) becomes low and the water heating apparatus is in a state of delivering hot water at a high temperature. As the flow rate toward the bypass side is smaller, a controllable range of delivery of hot water at a high temperature can be expanded as shown with a dashed line in FIG. 16.

In contrast, as shown in FIG. 2, when second notch $13b_1$ on the bypass side (third opening 11c side) is fully open, first notch $13a_1$ on the heat exchanger side (second opening 11b side) is fully closed. When the heat exchanger side is fully closed, a gap in the radial direction is provided in advance between arc portion $13a_2$ of first valve element 13a and the wall surface of the flow path and valve apparatus 1 is structured such that water at a certain constant flow rate flows, in spite of a fully closed state.

The constant flow rate above refers to at least a flow rate which can be sensed by a flow rate sensor (MOQ (Minimum Operation Quantity)≈flow rate toward the heat exchanger side 1.0 L/min).

Figure 16:
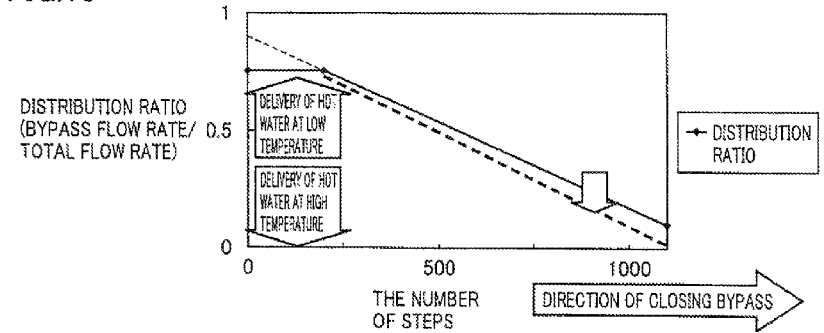
FIG. 16 is a diagram for illustrating a controllable range of a temperature of delivered hot water in the case where a gap in a radial direction is present between the valve element and the wall surface of the flow path and the case where it is not present.

In this case, a controllable range of delivery of hot water at a low temperature is narrower than in the case where there is no gap as shown with a solid line in FIG. 16, a distribution ratio around 0.7 will allow delivery of hot water at approximately 32° C. (a lowest temperature set in a water heater) even when incoming water is at 25° C. (a can body setting temperature of 50° C.).

A function and effect of the present embodiment will now be described.

In water heating apparatus 20 shown in FIG. 10, water which enters apparatus 20 is once distributed to the heat exchanger 21 side and the bypass circuit 22 side and water at a high temperature that has passed through heat exchanger 21 and water at a low temperature that has passed through bypass circuit 22 are mixed with each other, to thereby obtain a desired temperature of delivered hot water. In such distribution, extreme decrease in flow rate on the heat exchanger 21 side may result in a flow rate less than a flow rate which can be sensed by a flow rate sensor and failure in operation of apparatus 20. In addition, as water supply to the heat exchanger 21 side is completely cut off at once during combustion with burner 23, boiling or boil-dry in heat exchanger 21 may also take place.

According to the present embodiment, as described above, size L1 of the gap in the radial direction between arc portion $13a_2$ of the first valve element and the wall surface of flow path 11A shown in FIG. 2 is greater than size L2 of the gap in the radial direction between arc portion $13b_2$ of the second valve element and the wall surface of flow path 11A shown in FIG. 9. Therefore, by connecting second opening 11b to the heat exchanger 21 side, water can be supplied to the heat exchanger 21 side through a gap having a dimension L1 even when first notch $13a_1$ of first valve element 13a is closed. Therefore, boiling or boil-dry in heat exchanger 21 can be prevented. In addition, by connecting third opening 11c to bypass circuit 22, leakage of water toward the bypass circuit 22 side can be prevented while second notch $13b_1$ of second valve element 13b is closed. Thus, the distribution ratio (the flow rate toward the bypass circuit side/the total flow rate) can be lowered and delivery of hot water at a high temperature is enabled.

Moreover, since size L1 of the gap in the radial direction between arc portion $13a_2$ of first valve element 13a and the wall surface of flow path 11A is greater, wear due to contact between arc portion $13a_2$ of first valve element 13a and the wall surface of the flow path can be prevented. Furthermore, foreign matters are less likely to be bitten in between arc portion $13a_2$ of first valve element 13a and the wall surface of the flow path and hot water and water readily flow through the gap, so that an effect of improvement in drainage performance is also obtained.

Figure 17:
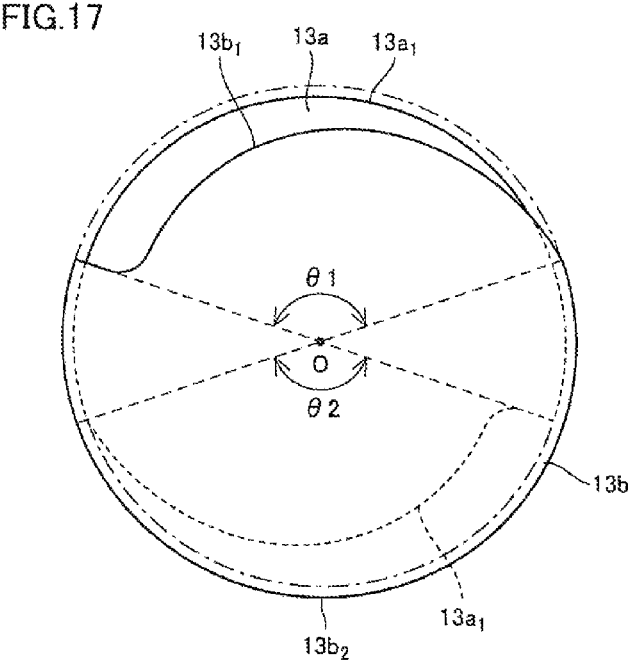
FIG. 17 is a diagram for illustrating a construction where a notch is provided in the valve element in a range smaller than 180°.
Figure 18:
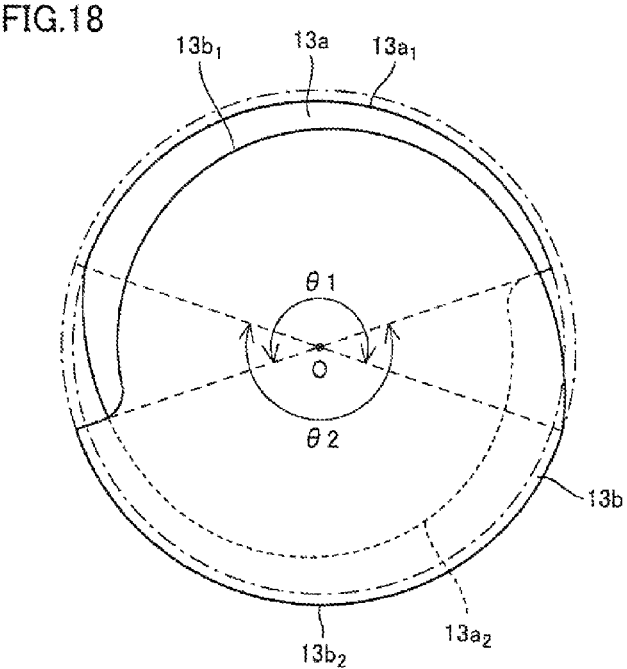
FIG. 18 is a diagram for illustrating a construction where a notch is provided in the valve element in a range exceeding 180°.

It is noted that, in the first to third embodiments above, first and second notches $13a_1$, $13b_1$ provided in respective first and second valve elements 13a, 13b are both formed in an angular range of approximately 180°. These formed angular ranges θ1, θ2 of first and second notches $13a_1$, $13b_1$ may both be smaller than 180° as shown in FIG. 17 or may exceed 180° as shown in FIG. 18.

Fourth Embodiment

In the first to third embodiments above, as shown in FIGS. 3 and 4, a construction where a large thickness portion of each of first and second valve elements 13a, 13b is not present on an outer circumferential side of each of first and second notches $13a_1$, $13b_1$ has been described. Likewise valve apparatus 1 in the present embodiment shown in FIGS. 19 and 20, however, large thickness portions $13a_3$, $13b_3$ of first and second valve elements 13a, 13b may be present on the outer circumferential sides of first and second notches $13a_1$, $13b_1$, respectively.

Figure 19:
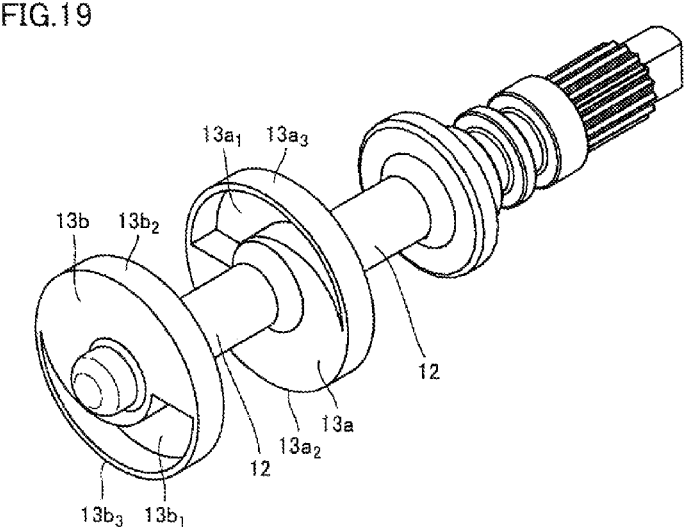
FIG. 19 is a perspective view schematically showing such features as a shaft body and a valve element in the case where a notch provided in the valve element is a notch opening.

Referring mainly to FIG. 19, in the present embodiment, first notch $13a_1$ is a notch opening formed to penetrate first valve element 13a in a disc shape (a circular shape when viewed in the axial direction of shaft body 12) while an outer shape of the disc shape of first valve element 13a is maintained. Therefore, on the outer circumferential side of first notch 13$a_1$, large thickness portion (for example, a portion having an arc shape) 13$a_3$ of first valve element 13a is located. Thus, when viewed in the axial direction of shaft body 12, the entire circumference of first notch 13$a_1$ is surrounded by the large thickness portion of first valve element 13a.

In addition, second notch 13$b_1$ is a notch opening formed to penetrate second valve element 13b in a disc shape (a circular shape when viewed in the axial direction of shaft body 12) while an outer shape of the disc shape of second valve element 13b is maintained. Therefore, on the outer circumferential side of second notch 13$b_1$, large thickness portion (for example, a portion having an arc shape) 13$b_3$ of second valve element 13b is located. Thus, when viewed in the axial direction of shaft body 12, the entire circumference of second notch 13$b_1$ is surrounded by the large thickness portion of second valve element 13b.

Figure 20:
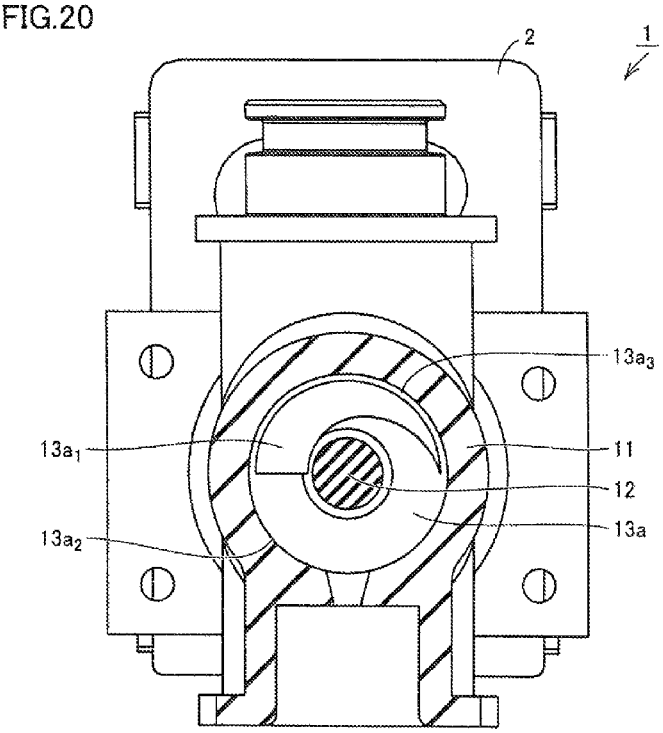
FIG. 20 is a cross-sectional view showing a manner in which the entire outer circumference of the valve element in a disc shape extends along a wall surface of a flow path in the valve main body in the valve apparatus having the shaft body, the valve element, and the like shown in FIG. 19.

Referring mainly to FIG. 20, while shaft body 12 having first and second valve elements 13a, 13b above is arranged in flow path 11A in valve main body 11, the entire outer circumference of each of first and second valve elements 13a, 13b extends along the wall surface of flow path 11A in valve main body 11.

It is noted that the present embodiment is otherwise substantially the same in construction as the first embodiment shown in FIGS. 1 to 3 and therefore the same elements have the same reference characters allotted and description thereof will not be repeated.

In the present embodiment, since first and second valve elements 13a, 13b can maintain their outer shapes like a disc, the entire outer circumference of the disc shape can extend along the wall surface of flow path 11A in valve main body 11. Therefore, consideration only of axial accuracy of two parts of valve main body 11 and first and second valve elements 13a, 13b will suffice, and strict axial accuracy of other parts (spacer 14) is not necessary. In addition, since the entire outer circumference of the disc shape can extend along the wall surface of flow path 11A, rotation of first and second valve elements 13a, 13b can be stabilized.

Though a case where both of first and second notches 13$a_1$, 13$b_1$ are notch openings has been described in the present embodiment, a construction may be such that only any one of first and second notches 13$a_1$, 13$b_1$ is a notch opening and any the other does not have a large thickness portion of a valve element on the outer circumferential side of the notch as shown in FIG. 4.

In addition, large thickness portion 13$a_3$ located on the outer circumferential side of first notch 13$a_1$ and large thickness portion 13$b_3$ located on the outer circumferential side of second notch 13$b_1$ do not have to surround the entire outer circumferential sides of respective notches 13$a_1$, 13$b_1$, and each of them may be discontinuous at a part on the outer circumferential side of notch 13$a_1$, 13$b_1$.

First and second notches 13$a_1$, 13$b_1$ are both formed in an angular range of approximately 180°. These formed angular ranges θ1, θ2 of first and second notches 13$a_1$, 13$b_1$ may both be smaller than 180° as shown in FIG. 17 or may exceed 180° as shown in FIG. 18.

Fifth Embodiment

Valve apparatus 1 in the present embodiment is characterized in that a gap forming projection portion GP is provided, that a valve element is located upstream of a shield portion, and that first and second shield portions 14a, 14b support shaft body 12 in the radial direction.

Figure 21:
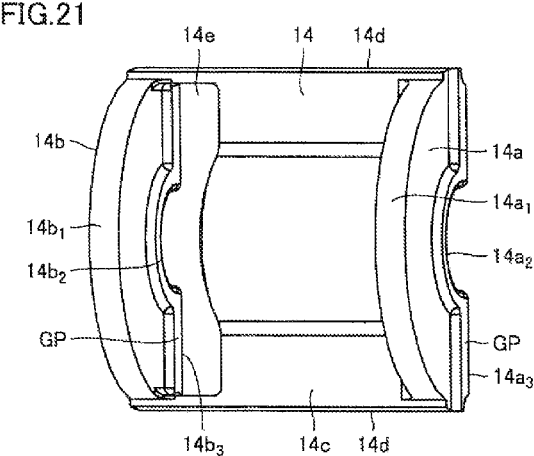
FIG. 21 is a perspective view schematically showing from above a construction of a spacer used for a valve apparatus in a fifth embodiment of the present invention.

Referring mainly to FIGS. 2 and 21, spacer 14 is provided separately from valve main body 11. First shield portion 14a of this spacer 14 has a first gap forming projection portion GP on a surface opposed to first valve element 13a. In addition, second shield portion 14b has a second gap forming projection portion GP on a surface opposed to second valve element 13b. First and second gap forming projection portions GP are formed to project in directions facing first valve element 13a and second valve element 13b along inner circumferential end surfaces 14$a_2$, 14$b_2$, respectively.

First gap forming projection portion GP forms a step on a surface of first shield portion 14a opposed to first valve element 13a, and second gap forming projection portion GP forms a step on a surface of second shield portion 14b opposed to second valve element 13b. Therefore, in a portion of the surface of first shield portion 14a opposed to first valve element 13a, where first gap forming projection portion GP is not formed, a gap is formed between first shield portion 14a and first valve element 13a. In addition, in a portion of the surface of second shield portion 14b opposed to second valve element 13b, where second gap forming projection portion GP is not formed, a gap is formed between second shield portion 14b and second valve element 13b.

Second valve element 13b is arranged upstream of second shield portion 14b, in a flow A of a fluid which flows through flow path 11A. In this attached state, each of inner circumferential end surface 14$a_2$ of first shield portion 14a and inner circumferential end surface 14$b_2$ of second shield portion 14b abuts to the outer circumferential surface of shaft body 12.

In addition, in such a state that valve apparatus 1 is attached to water heating apparatus 20 as shown in FIG. 10, third notch 14$b_3$ of second shield portion 14b is located in a lowermost portion of second shield portion 14b as shown in FIG. 8. Moreover, in this state, third notch 14$a_3$ of first shield portion 14a is also located in a lowermost portion of first shield portion 14a.

Referring mainly to FIG. 8, each of first and second shield portions 14a, 14b of spacer 14 supports shaft body 12 in the radial direction of shaft body 12 with respect to the wall surface of the flow path on the other end side of shaft body 12 (opposite to one end connected to stepping motor 2). Specifically, semi-circular outer circumferential end surfaces 14$a_1$, 14$b_1$ of respective first and second shield portions 14a, 14b abut to the circular wall surface of flow path 11A and semi-circular inner circumferential end surfaces 14$a_2$, 14$b_2$ of respective first and second shield portions 14a, 14b abut to the outer circumferential surface of shaft body 12.

In addition, a semi-cylindrical portion of coupling portion 14c of spacer 14 shown in FIG. 2 may abut to the outer circumferential surface of shaft body 12. First and second shield portions 14a, 14b and coupling portion 14c abut to the outer circumferential surface of shaft body 12, for example, in a range of 180°.

Referring mainly to FIG. 2, particularly, second shield portion 14b preferably supports shaft body 12 in the radial direction on the other end side of shaft body 12 relative to second valve element 13b. In addition, spacer 14 having first and second shield portions 14a, 14b is preferably arranged at a position radially opposed to a position where first opening 11a opens to flow path 11A.

Referring to FIG. 2, preferably, there is a small gap (dimension L1) in the radial direction between arc portion 13$a_2$ of first valve element 13a and the wall surface of the flow path so that arc portion 13$a_2$ and the wall surface of the flow path are not in direct contact with each other. In addition, referring to FIG. 9, preferably, there is a gap (dimension L2) in the radial direction between arc portion 13$b_2$ of second valve element 13b and the wall surface of the flow path so that arc portion 13$b_2$ and the wall surface of the flow path are not in direct contact with each other.

Though such a construction that first and second gap forming projection portions GP are provided in respective first and second shield portions 14a, 14b has been described in the embodiment above, first gap forming projection portion GP should only be provided in at least any part of opposing surfaces of first valve element 13a and first shield portion 14a, and second gap forming projection portion GP should only be provided in at least any part of opposing surfaces of second valve element 13b and second shield portion 14b. Therefore, first and second gap forming projection portions GP may be provided in respective first and second shield portions 14a, 14b or in respective first and second valve elements 13a, 13b. A construction where second gap forming projection portion GP is provided in second valve element 13b will be described below.

Figure 22:
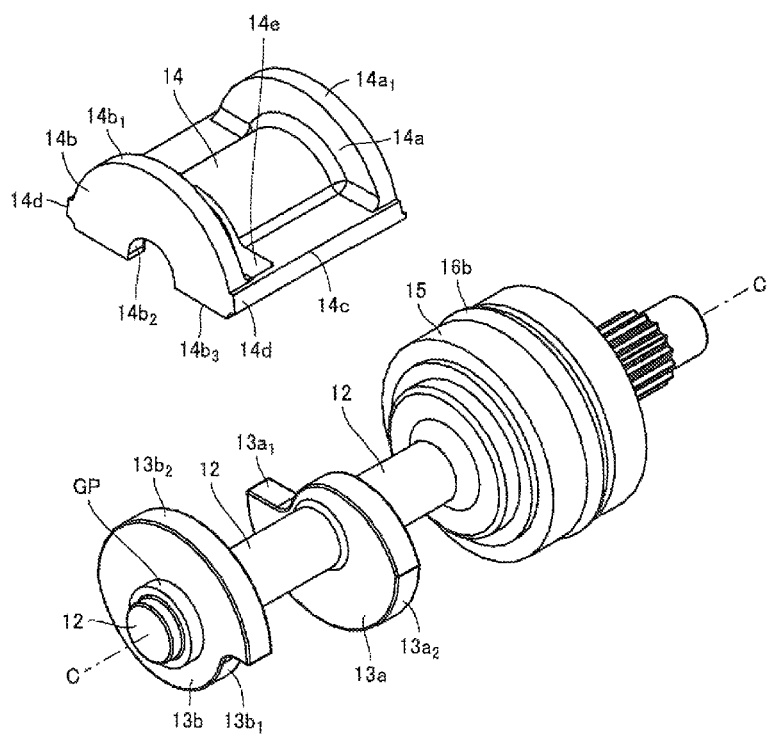
FIG. 22 is an exploded perspective view showing a construction in which a gap forming projection portion is provided in a valve element in the valve apparatus in the fifth embodiment of the present invention.

Referring to FIG. 22, second valve element 13b has second gap forming projection portion GP in a surface opposed to second shield portion 14b. Second gap forming projection portion GP is formed to project in a direction facing second shield portion 14b radially around shaft body 12. In addition, first valve element 13a may have first gap forming projection portion GP in a surface opposed to first shield portion 14a. First gap forming projection portion GP is formed to project in a direction facing first shield portion 14a radially around shaft body 12.

Thus, valve apparatus 1 in the present embodiment should only have at least one gap forming projection portion GP of first gap forming projection portion GP provided in at least any part of opposing surfaces of first valve element 13a and first shield portion 14a and second gap forming projection portion GP provided in at least any part of opposing surfaces of second valve element 13b and second shield portion 14b.

Though a construction where spacer 14 is arranged above flow path 11A as shown in FIG. 2 or the like has been described in the present embodiment, spacer 14 should only be arranged such that third notch $14b_3$ of second shield portion 14b is located in the lowermost portion of second shield portion 14b while valve apparatus 1 is attached to the water heating apparatus. A construction where spacer 14 is arranged vertically across flow path 11A will be described below.

Figure 23:
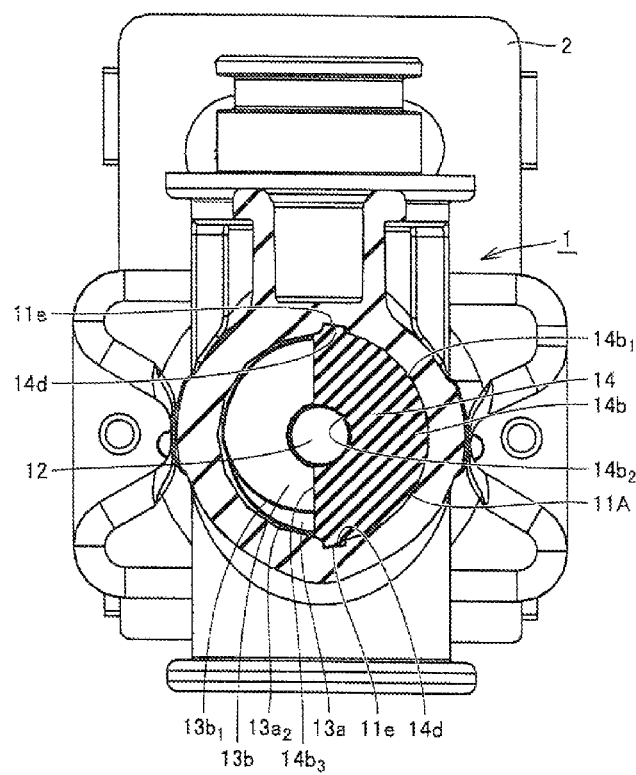
FIG. 23 is a cross-sectional view showing a manner in which the spacer is fixed to cover a right half of a flow path in the valve main body in the valve apparatus in the fifth embodiment of the present invention.

Referring to FIG. 23, while valve apparatus 1 is attached to the water heating apparatus, spacer 14 is arranged to cover a right half of flow path 11A in the figure. In this state, third notch $14b_3$ of second shield portion 14b is arranged to extend in an up/down direction in a left half of flow path 11A in the figure. In this state as well, third notch $14b_3$ of second shield portion 14b is located in the lowermost portion of second shield portion 14b. In this state, since the left half of flow path 11A is not covered with spacer 14, a fluid can flow to the lowermost portion of flow path 11A through third notch $14b_3$ of second shield portion 14b.

Though a construction where second valve element 13b is arranged upstream of second shield portion 14b in the case where valve apparatus 1 is used as a distribution valve has been described in the present embodiment, first valve element 13a may be arranged upstream of first shield portion 14a in the case where valve apparatus 1 is used as a distribution valve. The construction will be described below.

Figure 24:
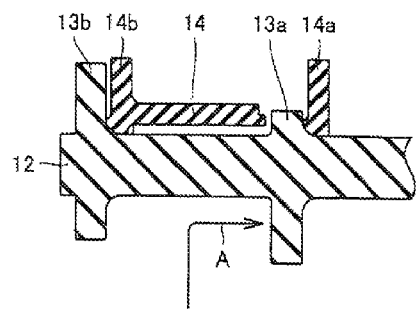
FIG. 24 is a cross-sectional view showing a construction of a valve element and a shield portion in a first variation of a portion corresponding to a P1 portion in FIG. 2, in the valve apparatus in the fifth embodiment of the present invention.

Referring to FIG. 24, first valve element 13a is attached to one end side of shaft body 12 and second valve element 13b is attached to the other end side of shaft body 12. In addition, first shield portion 14a is arranged on one end side of shaft body 12 and second shield portion 14b is arranged on the other end side of shaft body 12. In the case where valve apparatus 1 is used as the distribution valve, first valve element 13a is arranged upstream of first shield portion 14a, in flow A of a fluid which flows through flow path 11A.

Though a construction where only one of first and second valve elements 13a, 13b is arranged upstream of first or second shield portion 14a, 14b in the case where valve apparatus 1 is used as the distribution valve has been described in the embodiment above, first valve element 13a may be arranged upstream of first shield portion 14a and second valve element 13b may be arranged upstream of second shield portion 14b. The construction will be described below.

Figure 25:
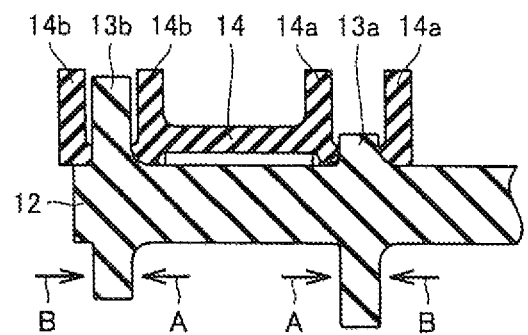
FIG. 25 is a cross-sectional view showing a construction of a valve element and a shield portion in a second variation of the portion corresponding to the P1 portion in FIG. 2, in the valve apparatus in the fifth embodiment of the present invention.

Referring to FIG. 25, first shield portion 14a constituted of two shield plates on one end side and the other end side of shaft body 12 is arranged so that first valve element 13a lies between the shield plates. In addition, second shield portion 14b constituted of two shield plates on one end side and the other end side of shaft body 12 is arranged so that second valve element 13b lies between the shield plates. In the case where valve apparatus 1 is used as the distribution valve, first valve element 13a is arranged upstream of one shield plate of first shield portion 14a, in flow A of a fluid which flows through flow path 11A. In addition, second valve element 13b is also arranged upstream of one shield plate of second shield portion 14b, in flow A of a fluid which flows through flow path 11A.

Alternatively, referring to FIG. 25, in the case where valve apparatus 1 is used as a mixing valve, a fluid flows through flow path 11A from second opening 11b and third opening 11c. In the case where valve apparatus 1 is used as the mixing valve as well, first valve element 13a is arranged upstream of the other shield plate of first shield portion 14a, in a flow B of a fluid which flows through flow path 11A. In addition, second valve element 13b is arranged upstream of the other shield plate of second shield portion 14b, in flow B of a fluid which flows through flow path 11A.

Figure 26:
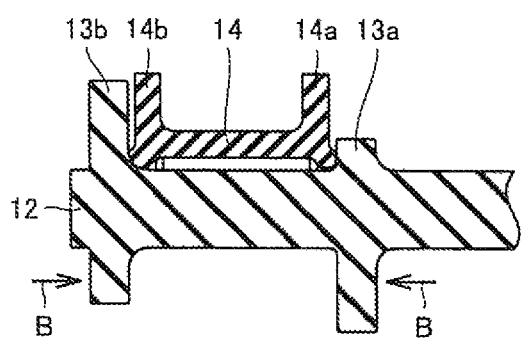
FIG. 26 is a cross-sectional view showing a construction of a valve element and a shield portion in a third variation of the portion corresponding to the P1 portion in FIG. 2, in the valve apparatus in the fifth embodiment of the present invention.

Alternatively, referring to FIG. 26, first and second shield portions 14a, 14b may be arranged only at positions lying between first and second valve elements 13a, 13b. First and second shield portions 14a, 14b are arranged to lie between first and second valve elements 13a, 13b. In the case where valve apparatus 1 is used only as the mixing valve, first valve element 13a is arranged upstream of first shield portion 14a, in flow B of a fluid which flows through flow path 11A. In addition, second valve element 13b is arranged upstream of second shield portion 14b, in flow B of a fluid which flows through flow path 11A.

Figure 27:
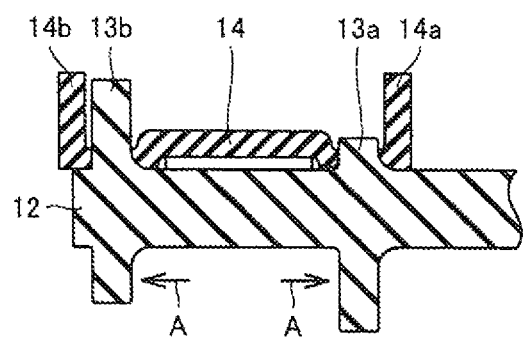
FIG. 27 is a cross-sectional view showing a construction of a valve element and a shield portion in a fourth variation of the portion corresponding to the P1 portion in FIG. 2, in the valve apparatus in the fifth embodiment of the present invention.

Alternatively, first and second shield portions 14a, 14b may be arranged only at such positions that first and second valve elements 13a, 13b lie therebetween. Referring to FIG. 27, first and second shield portions 14a, 14b are arranged such that first and second valve elements 13a, 13b lie therebetween. In the case where valve apparatus 1 is used only as the distribution valve, first valve element 13a is arranged upstream of first shield portion 14a, in flow A of a fluid which flows through flow path 11A. In addition, second valve element 13b is arranged upstream of second shield portion 14b, in flow A of a fluid which flows through flow path 11A.

Thus, valve apparatus 1 should only have at least one of a construction where first valve element 13a is arranged upstream of first shield portion 14a in a flow of a fluid which flows through flow path 11A and a construction where second valve element 13b is arranged upstream of second shield portion 14b in a flow of a fluid which flows through flow path 11A.

It is noted that valve apparatus 1 in the present embodiment is otherwise substantially the same in construction as valve apparatus 1 in the first embodiment described above and therefore the same elements have the same reference characters allotted and description thereof will not be repeated.

In addition, likewise the valve apparatus in the first embodiment, valve apparatus 1 in the present embodiment can be attached to water heating apparatus 20 as shown in FIG. 10.

While valve apparatus 1 is attached to water heating apparatus 20 as shown in FIG. 10, third notches $14a_3$, $14b_3$ of first and second shield portions 14a, 14b are located in the lowermost portions of first and second shield portions 14a, 14b respectively, as shown in FIG. 8.

In addition, an operation of valve apparatus 1 in the present embodiment is also substantially the same as the operation of valve apparatus 1 in the first embodiment shown in FIG. 11 and therefore description thereof will not be repeated.

Though a construction where two valve elements 13a, 13b are connected to a single shaft body has been described in the present embodiment, the present invention is applicable also to such a construction that a single valve element is connected to a single shaft body. The construction where a single valve element is connected to a single shaft body will be described below with reference to FIGS. 28 and 29.

Figure 28:
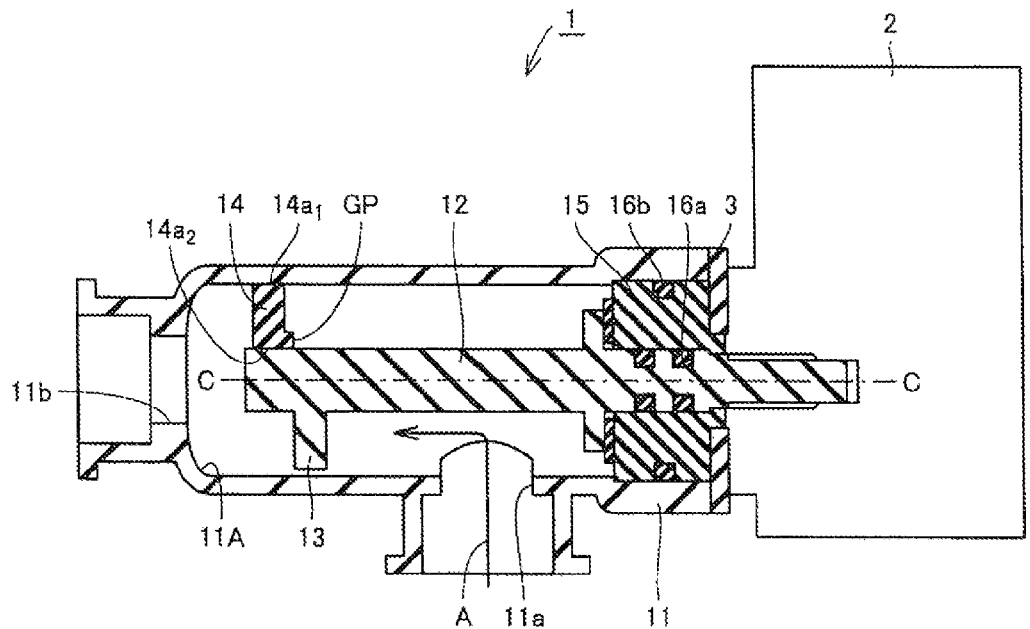
FIG. 28 is a cross-sectional view schematically showing a construction in a variation of the valve apparatus in the fifth embodiment of the present invention.
Figure 29:
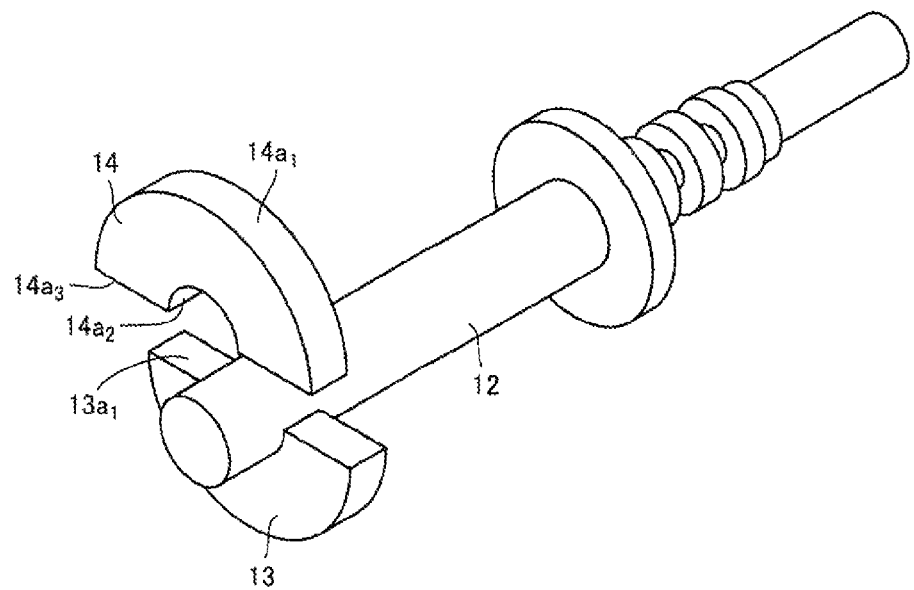
FIG. 29 is an exploded perspective view schematically showing a construction of a shaft body, a valve element, and a shield portion used for the valve apparatus shown in FIG. 28.

Referring to FIGS. 28 and 29, this construction of valve apparatus 1 is different from the construction of valve apparatus 1 shown in FIGS. 1 to 9 in that one valve element 13 is provided for one shaft body 12, that two openings 11a, 11b are provided in flow path 11A in valve main body 11, that notch 13a₁ in valve element 13 is semi-circular, and that shield portion 14 is semi-circular and does not have a coupling portion.

Valve element 13 is connected to the other end side opposite to one end where stepping motor 2 of shaft body 12 is connected. This valve element 13 has such a construction that semi-circular notch 13a₁ is provided in a disc shape. This valve element 13 is located between first opening 11a and second opening 11b. This valve element 13 is arranged upstream of shield portion 14 in flow A of a fluid which flows through flow path 11A.

Shield portion 14 has a semi-circular shape and it is arranged on the other end side of shaft body 12 relative to valve element 13. This shield portion 14 has outer circumferential end surface 14a₁ and inner circumferential end surface 14a₂, and outer circumferential end surface 14a₁ abuts to the wall surface of flow path 11A and inner circumferential end surface 14a₂ abuts to the outer circumferential surface of shaft body 12. Thus, shield portion 14 supports shaft body 12 in the radial direction of shaft body 12 with respect to the wall surface of the flow path on the other end side of shaft body 12.

Shield portion 14 has gap forming projection portion GP in a surface opposed to valve element 13. Gap forming projection portion GP is formed to project in a direction facing valve element 13a along inner circumferential end surface 14a₂. Shield portion 14 has such a shape that third notch 14a₃ is formed in a disc shape around axial line C-C as the center. Shield portion 14 is constructed such that third notch 14a₃ is located in the lowermost portion of shield portion 14 while valve apparatus 1 is attached to the water heating apparatus.

It is noted that valve apparatus 1 shown in FIGS. 28 and 29 is otherwise substantially the same in construction as valve apparatus 1 shown in FIGS. 1 to 9 and therefore the same elements have the same reference characters allotted and description thereof will not be repeated.

In valve apparatus 1 shown in FIGS. 28 and 29 as well, valve element 13 is arranged upstream of shield portion 14, in flow A of a fluid which flows through flow path 11A. Therefore, by bringing valve element 13 and shield portion 14 in intimate contact with each other by means of a fluid which flows through flow path 11A in valve apparatus 1, leakage of the fluid from between valve element 13 and shield portion 14 can be suppressed. Therefore, flow path 11A can sufficiently be sealed.

It is noted that a shape of first and second notches 13a₁, 13b₁ of valve apparatus 1 shown in FIGS. 1 to 9 and a shape of notch 13a₁ of valve apparatus 1 shown in FIGS. 28 and 29 are not limited to those described above. A shape of first and second notches 13a₁, 13b₁ of valve apparatus 1 shown above may be semi-circular, or a shape of notch 13a₁ of valve apparatus 1 shown in FIGS. 28 and 29 may be a shape resembling an involute shape.

In addition, the present invention is also applicable to a construction in which a valve apparatus is used in a water heating apparatus with bath re-heat function. A construction where a valve apparatus is used in a water heating apparatus with bath re-heat function will be described below with reference to FIG. 30.

Figure 30:
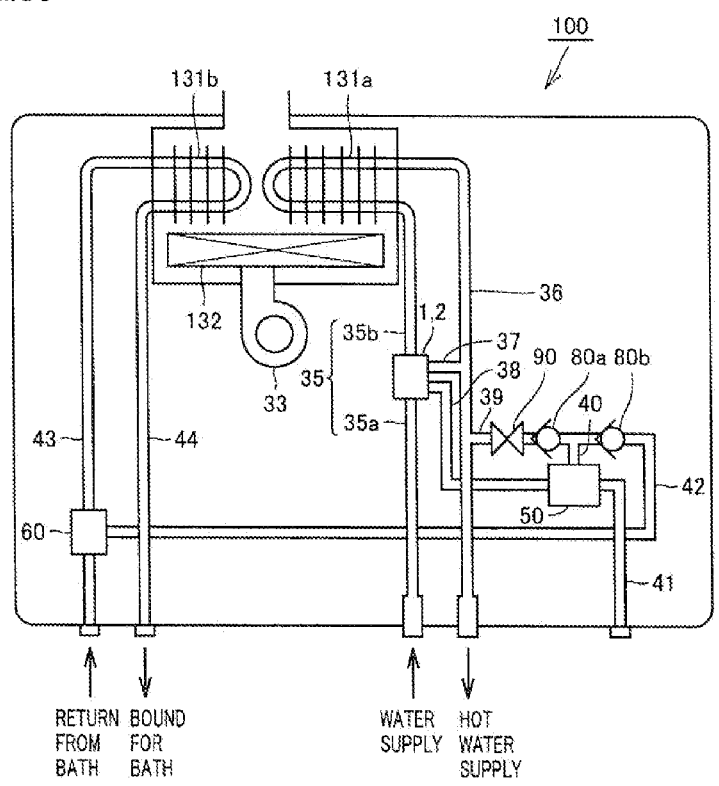
FIG. 30 is a diagram schematically showing a construction of a water heating apparatus with bath re-heat function including the valve apparatus and a stepping motor in the fifth embodiment of the present invention.

Referring to FIG. 30, a water heating apparatus with bath re-heat function 100 mainly has valve apparatus 1, stepping motor 2, a hot water supply side heat exchanger 131a, a bath side heat exchanger 131b, a burner 132, a fan 33, a water supply pipe 35, a hot water delivery pipe 36, a bypass circuit 37, pipes 38 to 44, a backflow prevention apparatus 50, a pump 60, check valves 80a, 80b, and a hot water pouring electromagnetic valve 90.

Water supply pipe 35 for supplying water to hot water supply side heat exchanger 131a and hot water delivery pipe 36 for delivering hot water from hot water supply side heat exchanger 131a are connected to hot water supply side heat exchanger 131a. Bypass circuit (bypass pipe) 37 connects this water supply pipe 35 and hot water delivery pipe 36 to each other. Valve apparatus 1 in the present embodiment having the construction shown in FIGS. 1 to 9 is connected, for example, to a portion of connection between water supply pipe 35 and bypass circuit 37.

On an inlet side of bath side heat exchanger 131b, a return-from-bath pipe 43 is connected, and on an outlet side of bath side heat exchanger 131b, a bath-bound pipe 44 is connected. Pump 60 mainly serves to circulate hot water and water between a bathtub (not shown) and bath side heat exchanger 131b, and it is connected to return-from-bath pipe 43.

Each of hot water supply side heat exchanger 131a and bath side heat exchanger 131b serves to carry out heat exchange with a combustion gas generated in burner 132. Fan 33 serves to supply air necessary for combustion to burner 132.

Backflow prevention apparatus 50 is a safety device for separating miscellaneous water and clean water in the bath from each other. This backflow prevention apparatus 50 normally closes an overflow port owing to a pressure difference between a pressure on a side of water supply of clean water (a primary pressure) and a pressure on a supply destination side (a secondary pressure), and backflow prevention apparatus 50 is connected to water supply pipe 35 through pipe 38 for introducing the primary pressure and connected to hot water delivery pipe 36 through pipes 39, 40, hot water pouring electromagnetic valve 90, and check valve 80a for introducing the secondary pressure. This pipe 40 is connected to return-from-bath pipe 43 through check valve 80b and pipe 42. It is noted that hot water pouring electromagnetic valve 90 serves to guide hot water and water in hot water delivery pipe 36 to a bath circuit through pipe 42 as it opens when a bathtub is filled with hot water.

In addition, since backflow prevention apparatus 50 opens when a negative pressure is generated on the water supply side due to break in water or the like so as to drain miscellaneous water from the overflow port to the outside of water heating apparatus 100, the overflow port is connected to a drainage portion of water heating apparatus 100 through pipe 41.

Referring mainly to FIGS. 2 and 21, first opening 11a of valve apparatus 1 is connected to a water supply side portion 35a of water supply pipe 35, and second opening 11b is connected to a heat exchanger side portion 35b of water supply pipe 35. In addition, third opening 11c is connected to bypass circuit 37. Fourth opening 11d is connected to pipe 38 connecting to a water pressure introduction port for introducing the primary pressure of backflow prevention apparatus 50.

A function and effect of the present embodiment will now be described in comparison with a valve apparatus described in Japanese Patent Laying-Open No. 4-141709 and a comparative example.

The valve apparatus described in the publication above is a mixing valve, and it has a mixing valve having a valve shaft to which a valve element for hot water and a valve element for water are attached in a mixing chamber connected to both of a hot water flow path and a water flow path. By moving this valve shaft in an axial direction by rotation, opening of the valve element for hot water with respect to a valve seat for hot water and opening of the valve element for water with respect to a valve seat for water are adjusted to thereby control a ratio of mixing hot water and water.

In the valve apparatus described in the publication above, however, the valve element for hot water is arranged downstream of the valve seat for hot water in the hot water flow path, and the valve element for water is also arranged downstream of the valve seat for water in the water flow path. Therefore, hot water which flows through the hot water flow path applies force to the valve element for hot water in a direction away from the valve seat for hot water, and water which flows through the water flow path applies force to the valve element for water in a direction away from the valve seat for water. Thus, hot water may leak from between the valve element for hot water and the valve seat for hot water, and water may leak from between the valve element for water and the valve seat for water. Therefore, when the valve element for hot water and the valve element for water fully close the hot water flow path and the water flow path respectively, disadvantageously, the flow path for hot water and the flow path for water cannot sufficiently be closed.

In such an assumed construction that second valve element 13b is arranged downstream of second shield portion 14b in flow A of a fluid which flows through flow path 11A in valve apparatus 1 shown in FIG. 2 (comparative example), the fluid which flows through flow path 11A applies force to second valve element 13b in a direction away from second shield portion 14b. Therefore, a fluid may leak from between second valve element 13b and second shield portion 14b.

In this case, in the construction as shown in FIG. 10 where third opening 11c is connected to bypass circuit 22 and second opening 11b is connected to heat exchanger side portion 31b of water supply pipe 31, a fluid leaks even though an attempt to fully close bypass circuit 22 with second valve element 13b and second shield portion 14b is made. Therefore, extra water flows through bypass circuit 22. Thus, a temperature of supplied hot water lowers. Then, a temperature of heat exchanger 21 should be raised for compensating for such lowering in temperature of supplied hot water. Consequently, energy efficiency lowers.

On the other hand, according to valve apparatus 1 in the present embodiment, as shown in FIG. 2, second valve element 13b is arranged upstream of second shield portion 14b in flow A of a fluid which flows through flow path 11A. Therefore, the fluid which flows through flow path 11A presses second valve element 13b against second shield portion 14b. Thus, second valve element 13b and second shield portion 14b can be in intimate contact with each other. As such, leakage of a fluid from between second valve element 13b and second shield portion 14b can be suppressed. Therefore, flow path 11A can sufficiently be sealed.

Thus, lowering in temperature of supplied hot water due to flow of extra water in bypass circuit 22 shown in FIG. 10 can be suppressed. Therefore, it is not necessary to raise a temperature of heat exchanger 21 for compensating for lowering in temperature of supplied hot water. Therefore, a temperature of heat exchanger 21 can be lowered. As such, it is not necessary to fully open burner 23. In addition, energy efficiency is good with all burners 23 burning on medium. Therefore, valve apparatus 1 in the present embodiment can achieve improved energy efficiency.

In addition, according to valve apparatus 1 in the present embodiment, an operation for opening and closing first and second notches $13a_1$, $13b_1$ can be performed by rotating first and second valve elements 13a, 13b, and hence opening of flow path 11A between first opening 11a and second opening 11b and opening of flow path 11A between first opening 11a and third opening 11c can simultaneously be adjusted. Therefore, a flow rate between first opening 11a and second opening 11b and a flow rate between first opening 11a and third opening 11c can simultaneously be controlled.

Moreover, it is not necessary to move first and second valve elements 13a, 13b in the direction of axial line C-C together with shaft body 12 in order to adjust opening above. Therefore, shaft body 12 does not have to be threaded and shaft body 12 can be made smaller in thickness. Thus, a drive source (such as a motor) for rotating shaft body 12 can be reduced in size. Therefore, a distribution ratio or a mixing ratio can be adjusted with a compact and simplified construction.

In valve apparatus 1 in the present embodiment, spacer 14 having first and second shield portions 14a, 14b is provided separately from valve main body 11 and fixed to the wall surface of flow path 11A in valve main body 11. Thus, spacer 14 can be prevented from rotating together with shaft body 12 when shaft body 12 rotates.

In valve apparatus 1 in the present embodiment, as shown in FIG. 2, valve apparatus 1 further includes gap forming projection portion GP provided in at least any part of opposing surfaces of first valve element 13a and first shield portion 14a. Thus, gap forming projection portion GP can achieve a smaller area where foreign matters are caught in the opposing surfaces of first valve element 13a and first shield portion 14a. Therefore, foreign matters being caught can be suppressed.

In addition, valve apparatus 1 further includes gap forming projection portion GP provided in at least any part of opposing surfaces of second valve element 13b and second shield portion 14b. Thus, likewise the above, foreign matters being caught between second valve element 13b and second shield portion 14b can also be suppressed.

In valve apparatus 1 in the present embodiment, flow path 11A has fourth opening 11d between second opening 11b and third opening 11c. Thus, as shown in FIG. 30, a water pressure introduction port of backflow prevention apparatus 50 can be connected to fourth opening 11d so that a stable water pressure of supplied water can be provided through fourth opening 11d.

By employing valve apparatus 1 in the present embodiment in water heating apparatus 20 in the present embodiment shown in FIG. 10, water heating apparatus 20 in which valve opening can be adjusted based on rotation of shaft body 12 provided with a valve element and rotation of shaft body 12 can be restricted can be obtained. Then, a water heating apparatus in which a flow path can sufficiently be sealed can be obtained.

The water heating apparatus in the present embodiment is constructed such that third notch $14a_3$ is located in the lowermost portion of first shield portion 14a while valve apparatus 1 is attached to water heating apparatus 20. Thus, a fluid can be drained from third notch $13a_3$ located in the lowermost portion of first shield portion 14a. Therefore, drainage performance of valve apparatus 1 can be improved and hence freezing of remaining water can be less likely.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A valve apparatus, comprising:
a valve main body including a flow path having a first opening as well as a second opening and a third opening arranged such that said first opening lies therebetween;
a shaft body arranged in said flow path in said valve main body and constructed to be rotatable around an axial line;
a first valve element connected to said shaft body to be located between said first opening and said second opening in said flow path and having a disc shape around said axial line as a center, with a first notch being formed therein; and
a second valve element connected to said shaft body to be located between said first opening and said third opening in said flow path and having a disc shape around said axial line as a center, with a second notch being formed therein,
said valve apparatus being constructed such that an operation for opening and closing said first and second notches can be performed by rotating said first and second valve elements around said axial line.

2. The valve apparatus according to claim 1, wherein said first notch is arranged to be in point symmetry with said second notch, with respect to said axial line.

3. The valve apparatus according to claim 1, wherein said first opening is an inlet port of a fluid into said flow path and each of said second and third openings is an outlet port of said fluid from said flow path, and
said valve apparatus is constructed such that a ratio of an amount of flow-out from any one of said second and third openings to a total amount of flow-out from said second and third openings linearly varies with respect to the number of steps in rotation of said shaft body around said axial line in a control range of the apparatus.

4. The valve apparatus according to claim 1, further comprising:
a first shield portion arranged in said flow path such that said first notch of said first valve element can be opened and closed by rotation of said first valve element around said axial line; and
a second shield portion arranged in said flow path such that said second notch of said second valve element can be opened and closed by rotation of said second valve element around said axial line.

5. The valve apparatus according to claim 4, having a construction in which said first valve element is arranged upstream of said first shield portion in a flow of a fluid flowing through said flow path and a construction in which said second valve element is arranged upstream of said second shield portion in the flow of the fluid flowing through said flow path.

6. The valve apparatus according to claim 4, wherein said first shield portion is arranged to be in point symmetry with said second shield portion, with respect to said axial line.

7. The valve apparatus according to claim 4, wherein a spacer having said first and second shield portions is provided separately from said valve main body and fixed to a wall surface of said flow path in said valve main body.

8. The valve apparatus according to claim 4, further comprising at least one gap forming projection portion of a first gap forming projection portion provided in at least any part of opposing surfaces of said first valve element and said first shield portion and a second gap forming projection portion provided in at least any part of opposing surfaces of said second valve element and said second shield portion.

9. The valve apparatus according to claim 4, wherein said first and second notches are constructed such that change in area of portions in said first and second notches which open in respective said first and second shield portions is in proportion to a square of an angle of rotation of said shaft body.

10. The valve apparatus according to claim 1, wherein at least one of said first and second notches is a notch opening formed to penetrate at least one valve element in a disc shape of said first and second valve elements while maintaining an outer shape of the disc shape of said at least one valve element.

11. The valve apparatus according to claim 1, wherein a gap in a radial direction between an arc portion of any one of said first and second valve elements and a wall surface of said flow path is greater than a gap in the radial direction between an arc portion of any the other of said first and second valve elements and the wall surface of said flow path.

12. The valve apparatus according to claim 1, wherein any one of said second and third openings and said first opening are provided in an orientation orthogonal to said axial line, and any the other of said second and third openings is provided in an orientation in parallel to said axial line.

13. The valve apparatus according to claim 1, wherein said flow path has a fourth opening between said second opening and said third opening.

14. A water heating apparatus, comprising said valve apparatus according to claim 4,
at least one shield portion of said first and second shield portions having a disc shape around said axial line as a center, with a third notch being formed therein and being constructed such that said third notch is located in a lowermost portion of said at least one shield portion while said valve apparatus is attached to said water heating apparatus.

15. A water heating apparatus, further comprising:
said valve apparatus according to claim 1;
a heat exchanger connected to any one of said second and third openings of said valve apparatus; and
a bypass circuit connected to any the other of said second and third openings of said valve apparatus.

* * * * *